US009560170B2

United States Patent
Bullotta et al.

(10) Patent No.: US 9,560,170 B2
(45) Date of Patent: Jan. 31, 2017

(54) SYSTEM AND METHOD OF ABSTRACTING COMMUNICATION PROTOCOL USING SELF-DESCRIBING MESSAGES

(71) Applicant: PTC Inc., Needham, MA (US)

(72) Inventors: Rick Bullotta, Phoenixville, PA (US); John Canosa, Needham, MA (US); Bob DeRemer, Needham, MA (US); Mike Mahoney, Needham, MA (US)

(73) Assignee: PTC Inc., Needham, MA (US)

( * ) Notice: Subject to any disclaimer, the term of this patent is extended or adjusted under 35 U.S.C. 154(b) by 130 days.

(21) Appl. No.: 14/222,067

(22) Filed: Mar. 21, 2014

(65) Prior Publication Data
US 2015/0271299 A1   Sep. 24, 2015

(51) Int. Cl.
*G06F 15/16* (2006.01)
*H04L 29/06* (2006.01)
(Continued)

(52) U.S. Cl.
CPC ............ *H04L 69/08* (2013.01); *G06F 9/00* (2013.01); *G06F 17/30* (2013.01); *H04L 67/02* (2013.01); *H04L 69/18* (2013.01); *H04W 4/005* (2013.01)

(58) Field of Classification Search
CPC ........ H04L 67/141; H04L 69/08; H04L 67/02; H04L 65/60; H04L 69/18; G06F 3/1245; G06F 9/546; G06F 9/00; G06F 17/30; G06F 11/3668; H04W 4/005
See application file for complete search history.

(56) References Cited

U.S. PATENT DOCUMENTS 3,656,112 A   4/1972   Paull
3,916,412 A   10/1975   Amoroso, Jr.
(Continued)

FOREIGN PATENT DOCUMENTS

EP   0497010 A2   8/1992
EP   1187015 A2   3/2002
(Continued)

OTHER PUBLICATIONS

International Search Report, PCT/US2015/021867, 4 pages, Jul. 31, 2015.
(Continued)

*Primary Examiner* — Ario Etienne
*Assistant Examiner* — Kidest Mendaye
(74) *Attorney, Agent, or Firm* — Meunier Carlin & Curfman LLC

(57) ABSTRACT

A system and method for abstracting communication protocol using self-describing messages. The method includes providing a first communication protocol having control codes and binary messages having a self-describing schema of a data object model. The method includes providing a second communication protocol where instances of the second communication protocol are associatively mapped to the instances of the first communication protocol. The method includes receiving a message in the second communication protocol. The method includes classifying the message as being either a control message or a data message and translating it to a second message where upon the message has been classified as a control message, the processor maps the control message to one or more control codes and where upon the message has been classified as a data message, the processor maps the data message to a corresponding binary message having the self-describing schema.

19 Claims, 23 Drawing Sheets

(51) Int. Cl.
  *G06F 9/00*    (2006.01)
  *G06F 17/30*   (2006.01)
  *H04W 4/00*    (2009.01)
  *H04L 29/08*   (2006.01)

(56) References Cited

U.S. PATENT DOCUMENTS

| | | |
|---|---|---|
| 3,983,484 A | 9/1976 | Hodama |
| 4,063,173 A | 12/1977 | Nelson et al. |
| 4,103,250 A | 7/1978 | Jackson |
| 4,134,068 A | 1/1979 | Richardson |
| 4,216,546 A | 8/1980 | Litt |
| 4,554,668 A | 11/1985 | Deman et al. |
| 4,601,059 A | 7/1986 | Gammenthaler |
| 4,680,582 A | 7/1987 | Mejia |
| 4,704,585 A | 11/1987 | Lind |
| 4,887,204 A | 12/1989 | Johnson et al. |
| 4,979,170 A | 12/1990 | Gilhousen et al. |
| 5,113,416 A | 5/1992 | Lindell |
| 5,134,615 A | 7/1992 | Freeburg et al. |
| 5,159,704 A | 10/1992 | Pirolli et al. |
| 5,276,703 A | 1/1994 | Budin et al. |
| 5,361,401 A | 11/1994 | Pirillo |
| 5,422,889 A | 6/1995 | Sevenhans et al. |
| 5,454,010 A | 9/1995 | Leveque |
| 5,479,441 A | 12/1995 | Tymes et al. |
| 5,493,671 A | 2/1996 | Pitt et al. |
| 5,515,365 A | 5/1996 | Sumner et al. |
| 5,734,966 A | 3/1998 | Farrer et al. |
| 5,737,609 A | 4/1998 | Reed et al. |
| 5,805,442 A | 9/1998 | Crater et al. |
| 5,892,962 A | 4/1999 | Cloutier |
| 5,909,640 A | 6/1999 | Farrer et al. |
| 5,925,100 A | 7/1999 | Drewry et al. |
| 6,169,992 B1 | 1/2001 | Beall et al. |
| 6,182,252 B1 | 1/2001 | Wong et al. |
| 6,198,480 B1 | 3/2001 | Cotugno et al. |
| 6,377,162 B1 | 4/2002 | Delestienne et al. |
| 6,430,602 B1 | 8/2002 | Kay et al. |
| 6,473,788 B1 | 10/2002 | Kim et al. |
| 6,510,350 B1 | 1/2003 | Steen, III et al. |
| 6,553,405 B1 | 4/2003 | Desrochers |
| 6,570,867 B1 | 5/2003 | Robinson et al. |
| 6,618,709 B1 | 9/2003 | Sneeringer |
| 6,675,193 B1 | 1/2004 | Slavin et al. |
| 6,757,714 B1 | 6/2004 | Hansen |
| 6,766,361 B1 | 7/2004 | Venigalla |
| 6,797,921 B1 | 9/2004 | Niedereder et al. |
| 6,810,522 B2 | 10/2004 | Cook et al. |
| 6,813,587 B2 | 11/2004 | McIntyre et al. |
| 6,850,255 B2 | 2/2005 | Muschetto |
| 6,859,757 B2 | 2/2005 | Muehl et al. |
| 6,880,016 B1 | 4/2005 | Van Der Heijden et al. |
| 6,915,330 B2 | 7/2005 | Hardy et al. |
| 6,980,558 B2 | 12/2005 | Aramoto |
| 6,993,555 B2 | 1/2006 | Kay et al. |
| 7,031,520 B2 | 4/2006 | Tunney |
| 7,046,134 B2 | 5/2006 | Hansen |
| 7,047,159 B2 | 5/2006 | Muehl et al. |
| 7,054,922 B2 | 5/2006 | Kinney et al. |
| 7,082,383 B2 | 7/2006 | Baust et al. |
| 7,082,460 B2 | 7/2006 | Hansen et al. |
| 7,117,239 B1 | 10/2006 | Hansen |
| 7,149,792 B1 | 12/2006 | Hansen et al. |
| 7,178,149 B2 | 2/2007 | Hansen |
| 7,185,014 B1 | 2/2007 | Hansen |
| 7,250,862 B2 | 7/2007 | Bornhoevd et al. |
| 7,254,601 B2 | 8/2007 | Baller et al. |
| 7,269,732 B2 | 9/2007 | Kilian-Kehr |
| 7,341,197 B2 | 3/2008 | Muehl et al. |
| 7,380,236 B2 | 5/2008 | Hawley |
| 7,496,911 B2 | 2/2009 | Rowley et al. |
| 7,529,570 B2 | 5/2009 | Shirota |
| 7,529,750 B2 | 5/2009 | Bair |
| 7,536,673 B2 | 5/2009 | Brendle et al. |
| 7,555,355 B2 | 6/2009 | Meyer |
| 7,566,005 B2 | 7/2009 | Heusermann et al. |
| 7,570,755 B2 | 8/2009 | Williams et al. |
| 7,587,251 B2 | 9/2009 | Hopsecger |
| 7,591,006 B2 | 9/2009 | Werner |
| 7,593,917 B2 | 9/2009 | Werner |
| 7,613,290 B2 | 11/2009 | Williams et al. |
| 7,616,642 B2 | 11/2009 | Anke et al. |
| 7,617,198 B2 | 11/2009 | Durvasula |
| 7,624,092 B2 | 11/2009 | Lieske et al. |
| 7,624,371 B2 | 11/2009 | Kulkarni et al. |
| 7,644,120 B2 | 1/2010 | Todorov et al. |
| 7,644,129 B2 | 1/2010 | Videlov |
| 7,647,407 B2 | 1/2010 | Omshehe et al. |
| 7,650,607 B2 | 1/2010 | Resnick et al. |
| 7,653,902 B2 | 1/2010 | Bozak et al. |
| 7,673,141 B2 | 3/2010 | Kilian-Kehr et al. |
| 7,684,621 B2 | 3/2010 | Tunney |
| 7,703,024 B2 | 4/2010 | Kautzleben et al. |
| 7,707,550 B2 | 4/2010 | Resnick et al. |
| 7,725,815 B2 | 5/2010 | Peters |
| 7,728,838 B2 | 6/2010 | Forney et al. |
| 7,730,498 B2 | 6/2010 | Resnick et al. |
| 7,743,015 B2 | 6/2010 | Schmitt |
| 7,743,155 B2 | 6/2010 | Pisharody et al. |
| 7,752,335 B2 | 7/2010 | Boxenhorn |
| 7,757,234 B2 | 7/2010 | Krebs |
| 7,761,354 B2 | 7/2010 | Kling et al. |
| 7,774,369 B2 | 8/2010 | Herzog et al. |
| 7,779,089 B2 | 8/2010 | Hessmer et al. |
| 7,779,383 B2 | 8/2010 | Bornhoevd et al. |
| 7,783,984 B2 | 8/2010 | Roediger et al. |
| 7,802,238 B2 | 9/2010 | Clinton |
| 7,814,044 B2 | 10/2010 | Schwerk |
| 7,814,208 B2 | 10/2010 | Stephenson et al. |
| 7,817,039 B2 | 10/2010 | Bornhoevd et al. |
| 7,827,169 B2 | 11/2010 | Enenkiel |
| 7,831,600 B2 | 11/2010 | Kilian |
| 7,840,701 B2 | 11/2010 | Hsu et al. |
| 7,849,213 B1 | 12/2010 | Borghetti |
| 7,852,861 B2 | 12/2010 | Wu et al. |
| 7,853,241 B1 | 12/2010 | Harrison |
| 7,853,924 B2 | 12/2010 | Curran |
| 7,860,968 B2 | 12/2010 | Bornhoevd et al. |
| 7,865,442 B1 | 1/2011 | Sowell |
| 7,865,731 B2 | 1/2011 | Kilian-Kehr |
| 7,865,939 B2 | 1/2011 | Schuster |
| 7,873,666 B2 | 1/2011 | Sauermann |
| 7,882,148 B2 | 2/2011 | Werner et al. |
| 7,886,278 B2 | 2/2011 | Stulski |
| 7,890,388 B2 | 2/2011 | Mariotti |
| 7,890,568 B2 | 2/2011 | Belenki |
| 7,895,115 B2 | 2/2011 | Bayyapu et al. |
| 7,899,777 B2 | 3/2011 | Baier et al. |
| 7,899,803 B2 | 3/2011 | Cotter et al. |
| 7,908,278 B2 | 3/2011 | Akkiraju et al. |
| 7,917,629 B2 | 3/2011 | Werner |
| 7,921,137 B2 | 4/2011 | Lieske et al. |
| 7,921,686 B2 | 4/2011 | Bagepalli et al. |
| 7,925,979 B2 | 4/2011 | Forney et al. |
| 7,937,370 B2 | 5/2011 | Hansen |
| 7,937,408 B2 | 5/2011 | Stuhec |
| 7,945,691 B2 | 5/2011 | Dharamshi |
| 7,953,219 B2 | 5/2011 | Freedman et al. |
| 7,954,107 B2 | 5/2011 | Mao et al. |
| 7,954,115 B2 | 5/2011 | Gisolfi |
| 7,966,418 B2 | 6/2011 | Shedrinsky |
| 7,975,024 B2 | 7/2011 | Nudler |
| 7,987,176 B2 | 7/2011 | Latzina et al. |
| 7,987,193 B2 | 7/2011 | Ganapam et al. |
| 7,992,200 B2 | 8/2011 | Kuehr-McLaren et al. |
| 8,000,991 B2 | 8/2011 | Montagut |
| 8,005,879 B2 | 8/2011 | Bornhoevd et al. |
| 8,024,218 B2 | 9/2011 | Kumar et al. |
| 8,024,743 B2 | 9/2011 | Werner |
| 8,051,045 B2 | 11/2011 | Vogler |
| 8,055,758 B2 | 11/2011 | Hansen |
| 8,055,787 B2 | 11/2011 | Victor et al. |
| 8,060,886 B2 | 11/2011 | Hansen |

(56) References Cited

U.S. PATENT DOCUMENTS

| | | |
|---|---|---|
| 8,065,397 B2 | 11/2011 | Taylor et al. |
| 8,069,362 B2 | 11/2011 | Gebhart et al. |
| 8,073,331 B1 | 12/2011 | Mazed |
| 8,074,215 B2 | 12/2011 | Cohen et al. |
| 8,081,584 B2 | 12/2011 | Thibault et al. |
| 8,082,322 B1 | 12/2011 | Pascarella et al. |
| 8,090,452 B2 | 1/2012 | Johnson et al. |
| 8,090,552 B2 | 1/2012 | Henry et al. |
| 8,095,632 B2 | 1/2012 | Hessmer et al. |
| 8,108,543 B2 | 1/2012 | Hansen |
| 8,126,903 B2 | 2/2012 | Lehmann et al. |
| 8,127,237 B2 | 2/2012 | Beringer |
| 8,131,694 B2 | 3/2012 | Bender et al. |
| 8,131,838 B2 | 3/2012 | Bornhoevd et al. |
| 8,136,034 B2 | 3/2012 | Stanton et al. |
| 8,145,468 B2 | 3/2012 | Fritzsche et al. |
| 8,145,681 B2 | 3/2012 | Macaleer et al. |
| 8,151,257 B2 | 4/2012 | Zachmann |
| 8,156,117 B2 | 4/2012 | Krylov et al. |
| 8,156,208 B2 | 4/2012 | Bornhoevd et al. |
| 8,156,473 B2 | 4/2012 | Heidasch |
| 8,166,118 B1 | 4/2012 | Borghetti |
| 8,183,995 B2 | 5/2012 | Wang et al. |
| 8,190,708 B1 | 5/2012 | Short et al. |
| 8,229,944 B2 | 7/2012 | Latzina et al. |
| 8,230,333 B2 | 7/2012 | Decherd et al. |
| 8,249,906 B2 | 8/2012 | Ponce de Leon |
| 8,250,169 B2 | 8/2012 | Beringer et al. |
| 8,254,249 B2 | 8/2012 | Wen et al. |
| 8,261,193 B1 | 9/2012 | Alur et al. |
| 8,271,935 B2 | 9/2012 | Lewis |
| 8,280,009 B2 | 10/2012 | Stepanian |
| 8,284,033 B2 | 10/2012 | Moran |
| 8,285,807 B2 | 10/2012 | Slavin et al. |
| 8,291,039 B2 | 10/2012 | Shedrinsky |
| 8,291,475 B2 | 10/2012 | Jackson et al. |
| 8,296,198 B2 | 10/2012 | Bhatt et al. |
| 8,296,266 B2 | 10/2012 | Lehmann et al. |
| 8,296,413 B2 | 10/2012 | Bornhoevd et al. |
| 8,301,770 B2 | 10/2012 | van Coppenolle et al. |
| 8,306,635 B2 | 11/2012 | Pryor |
| 8,312,383 B2 | 11/2012 | Gilfix |
| 8,321,790 B2 | 11/2012 | Sherrill et al. |
| 8,321,792 B1 | 11/2012 | Alur et al. |
| 8,331,855 B2 | 12/2012 | Williams et al. |
| 8,346,520 B2 | 1/2013 | Lu et al. |
| 8,359,116 B2 | 1/2013 | Manthey |
| 8,364,300 B2 | 1/2013 | Pouyez et al. |
| 8,370,479 B2 | 2/2013 | Hart et al. |
| 8,370,826 B2 | 2/2013 | Johnson et al. |
| 8,375,292 B2 | 2/2013 | Coffman et al. |
| 8,375,362 B1 | 2/2013 | Brette et al. |
| RE44,110 E | 3/2013 | Venigalla |
| 8,392,116 B2 | 3/2013 | Lehmann et al. |
| 8,392,561 B1 | 3/2013 | Dyer et al. |
| 8,396,929 B2 | 3/2013 | Helfman et al. |
| 8,397,056 B1 | 3/2013 | Malks et al. |
| 8,406,119 B2 | 3/2013 | Taylor et al. |
| 8,412,579 B2 | 4/2013 | Gonzalez |
| 8,417,764 B2 | 4/2013 | Fletcher et al. |
| 8,417,854 B2 | 4/2013 | Weng et al. |
| 8,423,418 B2 | 4/2013 | Hald et al. |
| 8,424,058 B2 | 4/2013 | Vinogradov et al. |
| 8,433,664 B2 | 4/2013 | Ziegler et al. |
| 8,433,815 B2 | 4/2013 | van Coppenolle et al. |
| 8,438,132 B1 | 5/2013 | Dziuk et al. |
| 8,442,933 B2 | 5/2013 | Baier et al. |
| 8,442,999 B2 | 5/2013 | Gorelik et al. |
| 8,443,069 B2 | 5/2013 | Bagepalli et al. |
| 8,443,071 B2 | 5/2013 | Lu et al. |
| 8,457,996 B2 | 6/2013 | Winkler et al. |
| 8,458,189 B1 | 6/2013 | Ludwig et al. |
| 8,458,315 B2 | 6/2013 | Miche et al. |
| 8,458,596 B1 | 6/2013 | Malks et al. |
| 8,458,600 B2 | 6/2013 | Dheap et al. |
| 8,473,317 B2 | 6/2013 | Santoso et al. |
| 8,478,861 B2 | 7/2013 | Taylor et al. |
| 8,484,156 B2 | 7/2013 | Hancsarik et al. |
| 8,489,527 B2 | 7/2013 | van Coppenolle et al. |
| 8,490,047 B2 | 7/2013 | Petschnigg et al. |
| 8,490,876 B2 | 7/2013 | Tan et al. |
| 8,495,072 B1 | 7/2013 | Kapoor et al. |
| 8,495,511 B2 | 7/2013 | Redpath |
| 8,495,683 B2 | 7/2013 | van Coppenolle et al. |
| 8,516,296 B2 | 8/2013 | Mendu |
| 8,516,383 B2 | 8/2013 | Bryant et al. |
| 8,521,621 B1 | 8/2013 | Hetzer et al. |
| 8,522,217 B2 | 8/2013 | Dutta et al. |
| 8,522,341 B2 | 8/2013 | Nochta et al. |
| 8,532,008 B2 | 9/2013 | Das et al. |
| 8,533,660 B2 | 9/2013 | Mehr et al. |
| 8,538,799 B2 | 9/2013 | Haller et al. |
| 8,543,568 B2 | 9/2013 | Wagenblatt |
| 8,547,838 B2 | 10/2013 | Lee et al. |
| 8,549,157 B2 | 10/2013 | Schnellbaecher |
| 8,555,248 B2 | 10/2013 | Brunswig et al. |
| 8,560,636 B2 | 10/2013 | Kieselbach |
| 8,560,713 B2 | 10/2013 | Moreira Sa de Souza et al. |
| 8,566,193 B2 | 10/2013 | Singh et al. |
| 8,571,908 B2 | 10/2013 | Li et al. |
| 8,572,107 B2 | 10/2013 | Fan et al. |
| 8,577,904 B2 | 11/2013 | Marston |
| 8,578,059 B2 | 11/2013 | Odayappan et al. |
| 8,578,328 B2 | 11/2013 | Kamiyama et al. |
| 8,578,330 B2 | 11/2013 | Dreiling et al. |
| 8,584,082 B2 | 11/2013 | Baird et al. |
| 8,588,765 B1 | 11/2013 | Harrison |
| 8,594,023 B2 | 11/2013 | He et al. |
| 8,635,254 B2 | 1/2014 | Harvey et al. |
| 8,689,181 B2 | 4/2014 | Biron, III |
| 8,745,641 B1* | 6/2014 | Coker .......... G06F 11/3668 719/313 |
| 8,752,074 B2 | 6/2014 | Hansen |
| 8,762,497 B2 | 6/2014 | Hansen |
| 8,769,095 B2 | 7/2014 | Hart et al. |
| 8,788,632 B2 | 7/2014 | Taylor et al. |
| 8,898,294 B2 | 11/2014 | Hansen |
| 9,002,980 B2 | 4/2015 | Shedrinsky |
| 2001/0054084 A1* | 12/2001 | Kosmynin ...... G06F 17/30067 709/218 |
| 2002/0099454 A1 | 7/2002 | Gerrity |
| 2002/0126703 A1 | 9/2002 | Kovacevic |
| 2002/0138596 A1 | 9/2002 | Darwin et al. |
| 2003/0005163 A1 | 1/2003 | Belzile |
| 2003/0093710 A1 | 5/2003 | Hashimoto et al. |
| 2003/0117280 A1 | 6/2003 | Prehn |
| 2004/0027376 A1 | 2/2004 | Calder et al. |
| 2004/0133635 A1 | 7/2004 | Spriestersbach et al. |
| 2004/0158455 A1 | 8/2004 | Spivack et al. |
| 2004/0158629 A1 | 8/2004 | Herbeck et al. |
| 2004/0177124 A1 | 9/2004 | Hansen |
| 2005/0015369 A1 | 1/2005 | Styles et al. |
| 2005/0021506 A1 | 1/2005 | Sauermann et al. |
| 2005/0027675 A1 | 2/2005 | Schmitt et al. |
| 2005/0060186 A1 | 3/2005 | Blowers et al. |
| 2005/0102362 A1 | 5/2005 | Price et al. |
| 2005/0198137 A1 | 9/2005 | Pavlik et al. |
| 2005/0213563 A1 | 9/2005 | Shaffer et al. |
| 2005/0240427 A1 | 10/2005 | Crichlow |
| 2005/0289154 A1 | 12/2005 | Weiss et al. |
| 2006/0031520 A1 | 2/2006 | Bedekar et al. |
| 2006/0186986 A1 | 8/2006 | Ma et al. |
| 2006/0208871 A1 | 9/2006 | Hansen |
| 2007/0005736 A1 | 1/2007 | Hansen et al. |
| 2007/0016557 A1 | 1/2007 | Moore et al. |
| 2007/0027854 A1 | 2/2007 | Rao et al. |
| 2007/0027914 A1 | 2/2007 | Agiwal |
| 2007/0104180 A1 | 5/2007 | Aizu et al. |
| 2007/0162486 A1 | 7/2007 | Brueggemann et al. |
| 2007/0174158 A1 | 7/2007 | Bredehoeft et al. |
| 2007/0260593 A1 | 11/2007 | Delvat |
| 2007/0266384 A1 | 11/2007 | Labrou et al. |
| 2007/0300172 A1 | 12/2007 | Runge et al. |
| 2008/0098085 A1 | 4/2008 | Krane et al. |

(56) References Cited

U.S. PATENT DOCUMENTS

| | | | |
|---|---|---|---|
| 2008/0104615 A1* | 5/2008 | Nolan | G06F 19/322 719/328 |
| 2008/0172632 A1 | 7/2008 | Stambaugh | |
| 2008/0208890 A1 | 8/2008 | Milam | |
| 2008/0222599 A1 | 9/2008 | Nathan et al. | |
| 2008/0231414 A1 | 9/2008 | Canosa | |
| 2008/0244077 A1 | 10/2008 | Canosa | |
| 2008/0244594 A1 | 10/2008 | Chen et al. | |
| 2008/0255782 A1 | 10/2008 | Bilac et al. | |
| 2008/0319947 A1 | 12/2008 | Latzina et al. | |
| 2009/0006391 A1 | 1/2009 | Ram | |
| 2009/0006467 A1* | 1/2009 | Visscher | G06Q 10/06 |
| 2009/0150431 A1 | 6/2009 | Schmidt et al. | |
| 2009/0193148 A1 | 7/2009 | Jung et al. | |
| 2009/0259442 A1 | 10/2009 | Gandikota et al. | |
| 2009/0265760 A1 | 10/2009 | Zhu et al. | |
| 2009/0299990 A1 | 12/2009 | Setlur et al. | |
| 2009/0300060 A1 | 12/2009 | Beringer et al. | |
| 2009/0319518 A1 | 12/2009 | Koudas et al. | |
| 2009/0327337 A1 | 12/2009 | Lee et al. | |
| 2010/0017379 A1 | 1/2010 | Naibo et al. | |
| 2010/0017419 A1 | 1/2010 | Francis et al. | |
| 2010/0064277 A1 | 3/2010 | Baird et al. | |
| 2010/0077001 A1 | 3/2010 | Vogel et al. | |
| 2010/0094843 A1 | 4/2010 | Cras | |
| 2010/0125584 A1 | 5/2010 | Navas | |
| 2010/0125826 A1 | 5/2010 | Rice et al. | |
| 2010/0250440 A1 | 9/2010 | Wang et al. | |
| 2010/0257242 A1 | 10/2010 | Morris | |
| 2010/0281107 A1* | 11/2010 | Fallows | G06F 9/54 709/203 |
| 2010/0286937 A1 | 11/2010 | Hedley et al. | |
| 2010/0287075 A1 | 11/2010 | Herzog et al. | |
| 2010/0293360 A1 | 11/2010 | Schoop et al. | |
| 2010/0332454 A1 | 12/2010 | Prahlad et al. | |
| 2011/0078599 A1 | 3/2011 | Guertler et al. | |
| 2011/0078600 A1 | 3/2011 | Guertler et al. | |
| 2011/0099190 A1 | 4/2011 | Kreibe | |
| 2011/0137883 A1 | 6/2011 | Lagad et al. | |
| 2011/0138354 A1 | 6/2011 | Hertenstein et al. | |
| 2011/0145712 A1 | 6/2011 | Pontier et al. | |
| 2011/0145933 A1 | 6/2011 | Gambhir et al. | |
| 2011/0153505 A1 | 6/2011 | Brunswig et al. | |
| 2011/0154226 A1 | 6/2011 | Guertler et al. | |
| 2011/0161409 A1 | 6/2011 | Nair et al. | |
| 2011/0173203 A1 | 7/2011 | Jung et al. | |
| 2011/0173220 A1 | 7/2011 | Jung et al. | |
| 2011/0173264 A1 | 7/2011 | Kelly | |
| 2011/0208788 A1 | 8/2011 | Heller et al. | |
| 2011/0209069 A1 | 8/2011 | Mohler | |
| 2011/0219327 A1 | 9/2011 | Middleton, Jr. et al. | |
| 2011/0222838 A1 | 9/2011 | Dachiku | |
| 2011/0231592 A1 | 9/2011 | Bleier et al. | |
| 2011/0276360 A1 | 11/2011 | Barth et al. | |
| 2011/0307295 A1 | 12/2011 | Steiert et al. | |
| 2011/0307363 A1 | 12/2011 | N et al. | |
| 2011/0307405 A1 | 12/2011 | Hammer et al. | |
| 2011/0320525 A1 | 12/2011 | Agarwal et al. | |
| 2012/0005577 A1 | 1/2012 | Chakra et al. | |
| 2012/0059856 A1 | 3/2012 | Kreibe et al. | |
| 2012/0072435 A1 | 3/2012 | Han | |
| 2012/0072885 A1 | 3/2012 | Taragin et al. | |
| 2012/0078959 A1 | 3/2012 | Cho et al. | |
| 2012/0096429 A1 | 4/2012 | Desai et al. | |
| 2012/0131473 A1 | 5/2012 | Biron, III | |
| 2012/0136649 A1 | 5/2012 | Freising et al. | |
| 2012/0143970 A1 | 6/2012 | Hansen | |
| 2012/0144370 A1 | 6/2012 | Kemmler et al. | |
| 2012/0150859 A1 | 6/2012 | Hu | |
| 2012/0158825 A1 | 6/2012 | Ganser | |
| 2012/0158914 A1 | 6/2012 | Hansen | |
| 2012/0166319 A1 | 6/2012 | Deledda et al. | |
| 2012/0167006 A1 | 6/2012 | Tillert et al. | |
| 2012/0173671 A1 | 7/2012 | Callaghan et al. | |
| 2012/0179905 A1 | 7/2012 | Ackerly | |
| 2012/0197488 A1 | 8/2012 | Lee et al. | |
| 2012/0197852 A1 | 8/2012 | Dutta et al. | |
| 2012/0197856 A1 | 8/2012 | Banka et al. | |
| 2012/0197898 A1 | 8/2012 | Pandey et al. | |
| 2012/0197911 A1 | 8/2012 | Banka et al. | |
| 2012/0239381 A1 | 9/2012 | Heidasch | |
| 2012/0239606 A1 | 9/2012 | Heidasch | |
| 2012/0254825 A1 | 10/2012 | Sharma et al. | |
| 2012/0259932 A1 | 10/2012 | Kang et al. | |
| 2012/0284259 A1 | 11/2012 | Jehuda | |
| 2012/0311501 A1 | 12/2012 | Nonez et al. | |
| 2012/0311526 A1 | 12/2012 | DeAnna et al. | |
| 2012/0311547 A1 | 12/2012 | DeAnna et al. | |
| 2012/0324066 A1 | 12/2012 | Alam et al. | |
| 2013/0006400 A1 | 1/2013 | Caceres et al. | |
| 2013/0036137 A1 | 2/2013 | Ollis et al. | |
| 2013/0054563 A1 | 2/2013 | Heidasch | |
| 2013/0060791 A1 | 3/2013 | Szalwinski et al. | |
| 2013/0067031 A1 | 3/2013 | Shedrinsky | |
| 2013/0067302 A1 | 3/2013 | Chen et al. | |
| 2013/0073969 A1 | 3/2013 | Blank et al. | |
| 2013/0080898 A1 | 3/2013 | Lavian et al. | |
| 2013/0110496 A1 | 5/2013 | Heidasch | |
| 2013/0110861 A1 | 5/2013 | Roy et al. | |
| 2013/0124505 A1 | 5/2013 | Bullotta et al. | |
| 2013/0124616 A1 | 5/2013 | Bullotta et al. | |
| 2013/0125053 A1 | 5/2013 | Brunswig et al. | |
| 2013/0132385 A1 | 5/2013 | Bullotta et al. | |
| 2013/0166563 A1 | 6/2013 | Mueller et al. | |
| 2013/0166568 A1 | 6/2013 | Binkert et al. | |
| 2013/0166569 A1 | 6/2013 | Navas | |
| 2013/0173062 A1 | 7/2013 | Koenig-Richardson | |
| 2013/0179565 A1 | 7/2013 | Hart et al. | |
| 2013/0185593 A1 | 7/2013 | Taylor et al. | |
| 2013/0185786 A1 | 7/2013 | Dyer et al. | |
| 2013/0191767 A1 | 7/2013 | Peters et al. | |
| 2013/0207980 A1 | 8/2013 | Ankisettipalli et al. | |
| 2013/0211555 A1 | 8/2013 | Lawson et al. | |
| 2013/0246897 A1 | 9/2013 | O'Donnell | |
| 2013/0246906 A1* | 9/2013 | Hamon | G06F 17/2252 715/234 |
| 2013/0262641 A1 | 10/2013 | Zur et al. | |
| 2013/0275344 A1 | 10/2013 | Heidasch | |
| 2013/0275550 A1 | 10/2013 | Lee et al. | |
| 2013/0290441 A1 | 10/2013 | Levy | |
| 2013/0304581 A1 | 11/2013 | Soroca et al. | |
| 2014/0016455 A1 | 1/2014 | Ruetschi et al. | |
| 2014/0019432 A1 | 1/2014 | Lunenfeld | |
| 2014/0032531 A1 | 1/2014 | Ravi et al. | |
| 2014/0040286 A1 | 2/2014 | Bane et al. | |
| 2014/0040433 A1 | 2/2014 | Russell, Jr. et al. | |
| 2014/0095211 A1 | 4/2014 | Gloerstad et al. | |
| 2014/0156725 A1 | 6/2014 | Mandyam | |
| 2014/0164358 A1 | 6/2014 | Benzatti | |
| 2014/0223334 A1 | 8/2014 | Jensen et al. | |
| 2014/0282370 A1 | 9/2014 | Schaefer et al. | |
| 2015/0007199 A1* | 1/2015 | Valeva | G06F 9/546 719/313 |
| 2015/0058833 A1 | 2/2015 | Venkata Naga Ravi | |
| 2015/0127810 A1 | 5/2015 | Cao | |
| 2015/0271109 A1 | 9/2015 | Bullotta et al. | |
| 2015/0271229 A1 | 9/2015 | Bullotta et al. | |
| 2015/0271271 A1 | 9/2015 | Bullotta et al. | |
| 2015/0271272 A1 | 9/2015 | Mahoney et al. | |
| 2015/0271295 A1 | 9/2015 | Mahoney et al. | |
| 2015/0271301 A1 | 9/2015 | Mahoney et al. | |

FOREIGN PATENT DOCUMENTS

| | | |
|---|---|---|
| WO | WO-99/21152 A1 | 4/1999 |
| WO | WO-00/77592 A2 | 12/2000 |
| WO | WO-2008/115995 A1 | 9/2008 |
| WO | WO-2014/145084 A1 | 9/2014 |

OTHER PUBLICATIONS

International Search Report, PCT/US2015/021882, 4 pages, Jul. 30, 2015.

(56) References Cited

OTHER PUBLICATIONS

Written Opinion, PCT/US2015/021867, 12 pages, Jul. 31, 2015.
Written Opinion, PCT/US2015/021882, 13 pages, Jul. 30, 2015.
Shi, L. et al., Understanding Text Corpora with Multiple Facets, IEEE Symposium on Visual Analytics Science and Technology (VAST), 99-106 (2010).
Hart Server, retrieved from 2001 internet archive of hartcomm.org http://www.hartcomm.org/server2/index.html, 13 pages (2001).
Ray, Erik T., Learning XML, First Edition, 277 pages (2001).
Final Office Action issued in related U.S. Appl. No. 14/222,083 mailed Aug. 15, 2016.

* cited by examiner

| | | |
|---|---|---|
| 000 00001 (0x01) | GET | |
| 000 00010 (0x02) | PUT | |
| 000 00011 (0x03) | POST | |
| 000 00100 (0x04) | DELETE | 330 |
| 000 01010 (0x0A) | BIND | |
| 000 01011 (0x0B) | UNBIND | |
| 000 11000 (0x14) | AUTH | |
| 000 11111 (0x1F) | KEEP_ALIVE | |
| 01000000 (0x40) | STATUS_SUCCESS((short)200,(byte)0x40), | 332a |
| 01000001 (0x41) | STATUS_CREATED((short)201,(byte)0x41), | |
| 01000010 (0x42) | STATUS_ACCEPTED((short)202,(byte)0x42), | |
| 01000100 (0x44) | STATUS_NO_CONTENT((short)204,(byte)0x44), | |
| 01000110 (0x46) | STATUS_PARTIAL_CONTENT((short)206,(byte)0x46), | |
| 01100000 (0x60) | STATUS_MULTIPLE_CHOICES((short)300,(byte)0x60), | |
| 01100001 (0x61) | STATUS_MOVED_PERMANENTLY((short)301,(byte)0x61), | |
| 01100010 (0x62) | STATUS_FOUND((short)302,(byte)0x62), | |
| 01100011 (0x63) | STATUS_SEE_OTHER((short)303,(byte)0x63), | |
| 01100100 (0x64) | STATUS_NOT_MODIFIED((short)304,(byte)0x64), | |
| 01100101 (0x65) | STATUS_USE_PROXY((short)305,(byte)0x65), | |
| 01100111 (0x67) | STATUS_TEMPORARY_REDIRECT((short)307,(byte)0x67), | 322b |
| 10000000 (0x80) | STATUS_BAD_REQUEST((short)400,(byte)0x80), | |
| 10000001 (0x81) | STATUS_UNAUTHORIZED((short)401,(byte)0x81), | |
| 10000010 (0x82) | STATUS_PAYMENT_REQUIRED((short)402,(byte)0x82), | |
| 10000011 (0x83) | STATUS_FORBIDDEN((short)403,(byte)0x83), | |
| 10000100 (0x84) | STATUS_NOT_FOUND((short)404,(byte)0x84), | |
| 10000101 (0x85) | STATUS_METHOD_NOT_ALLOWED((short)405,(byte)0x85), | |
| 10000110 (0x86) | STATUS_NOT_ACCEPTABLE((short)406,(byte)0x86), | |
| 10001000 (0x88) | STATUS_REQUEST_TIMEOUT((short)408,(byte)0x88), | |
| 10001001 (0x89) | STATUS_CONFLICT((short)409,(byte)0x89), | |
| 10010010 (0x92) | STATUS_I_AM_A_TEAPOT((short)418,(byte)0x92), | |
| 10010100 (0x94) | STATUS_I_AM_BUZZED((short)420,(byte)0x94), | |
| 10100000 (0xA0) | STATUS_INTERNAL_ERROR((short)500,(byte)0xA0), | |
| 10100001 (0xA1) | STATUS_NOT_IMPLEMENTED((short)501,(byte)0xA1), | |
| 10100010 (0xA2) | STATUS_BAD_GATEWAY((short)502,(byte)0xA2), | |
| 10100011 (0xA3) | STATUS_SERVICE_UNAVAILABLE((short)503,(byte)0xA3), | 322c |
| 10100100 (0xA4) | STATUS_GATEWAY_TIMEOUT((short)504,(byte)0xA4), | |
| 11100000 (0xE0) | STATUS_COMM_ERROR ((short)700,(byte)0xE0), | |
| 11100001 (0xE1) | STATUS_SERVER_REFUSED((short)701,(byte)0xE1), | |
| 11100010 (0xE2) | STATUS_SERVER_UNAVAILABLE((short)702,(byte)0xE2), | |
| 11100011 (0xE3) | STATUS_COMM_TIMEOUT((short)703,(byte)0xE3) | |

FIG. 3C

╭─ 402                                                                                            391 Bytes
│ 01 0d 70 75 73 68 54 68 72 65 73 68 6f 6c 64 39 43 68 61 6e 67 65 20 74 68 72 65 73 68 6f 6c 64 20 74 6f 20 67 65
│ 6e 65 72 61 74 65 20 65 76 65 6e 74 20 66 6f 72 20 6e 75 6d 65 72 69 63 20 70 72 6f 70 65 72 74 69 65 73 01 00 00
│ 01 08 65 64 67 65 4e 61 6d 65 12 45 64 67 65 20 70 72 6f 70 65 72 74 79 20 6e 61 6d 65 00 00 01 0c 69 73 50 72 69
│ 6d 61 72 79 4b 65 79 02 01 01 08 70 75 73 68 54 79 70 65 43 53 74 72 69 6e 67 20 72 65 70 72 65 73 65 6e 74 69
│ 6e 67 20 70 75 73 68 20 74 79 70 65 20 66 6f 72 20 65 76 65 6e 74 20 6e 6f 74 69 66 69 63 61 74 69 6f 6e 20 74 6f
│ 20 73 75 62 73 63 72 69 62 65 72 73 00 00 00 00 00 01 00 03 01 40 f8 6a 00 00 00 00 00 00 0f 49 6e 4d 65 6d 6f 72 79
│ 5f 53 74 72 69 6e 67 00 05 4e 45 56 45 52 01 00 03 01 40 f8 6a 00 00 00 00 00 00 10 49 6e 4d 65 6d 6f 72 79 5f 42
│ 6f 6f 6c 65 61 6e 00 05 4e 45 56 45 52 01 00 03 01 40 f8 6a 00 00 00 00 00 00 11 49 6e 4d 65 6d 6f 72 79 5f 4c 6f 63
│ 61 74 69 6f 6e 00 05 4e 45 56 45 52 01 00 03 01 40 f8 6a 00 00 00 00 00 00 0f 49 6e 4d 65 6d 6f 72 79 5f 4e 75 6d
│ 62 65 72 00 05 4e 45 56 45 52 01 00 03 01 40 f8 6a 00 00 00 00 00 00 11 49 6e 4d 65 6d 6f 72 79 5f 44 61 74 65 74
│ 69 6d 65 00 05 4e 45 56 45 52 00
╰──────────────────────────────────────────────────────────────────────────────────────────────────────────────

Fig. 6A

```
                                        ┌─802                         852 Bytes
{
"dataShape":
        {
        "fieldDefinitions":
                {
                "pushThreshold":
                        {
                        "name":"pushThreshold",
                        "description":"Change threshold to generate event for numeric properties",
                        "baseType":"NUMBER",
                        "aspects":{}
                        },
                "edgeName":
                        {
                        "name":"edgeName",
                        "description":"Edge property name",
                        "baseType":"STRING",
                        "aspects":
                                {
                                "name":"isPrimaryKey",
                                "isPrimaryKey":true
                                }
                        },
                "pushType":
                        {
                        "name":"pushType",
                        "description":"String representing push type
                                        for event notification to subscribers",
                        "baseType": "STRING",
                        "aspects":{ }
                        }
                }
        },
        "rows":
                {
                        {"pushThreshold":100000,"edgeName":"InMemory_String","pushType":"NEVER" },
                        {"pushThreshold":100000,"edgeName":"InMemory_Boolean","pushType":"NEVER"},
                        {"pushThreshold":100000,"edgeName":"InMemory_Location","pushType":"NEVER"},
                        {"pushThreshold":100000,"edgeName":"InMemory_Number","pushType":"NEVER"},
                        {"pushThreshold":100000,"edgeName":"InMemory_DateTime","pushType":"NEVER"}
                }
}
```

FIG. 6B

SYSTEM AND METHOD OF ABSTRACTING COMMUNICATION PROTOCOL USING SELF-DESCRIBING MESSAGES

FIELD OF THE INVENTION

This invention generally relates to machine-to-machine communication. More particularly, in certain embodiment, the invention relates to abstracting messages embodied in a third party communication protocol to self-describing message embodied in a dynamic REST communication protocol.

BACKGROUND

The business of building a connected world, also referred to as the Internet of Things, is rapidly growing. Some industry analysts have estimated that the number of connected devices and systems (in an industrial, consumer, government, and business setting) may rise from five billion devices to a trillion devices over the next ten years. A substantial portion of that growth will be devices and systems using wireless communication, such as over cellular networks.

Common challenges in the controls and management of such connected devices include scalability and operability, not only within a particular vendor's own platform, but among the various platforms being offered by different vendors. One particular intersection of these challenges is the communication protocol used in the controls and management of such devices. These protocols define how devices talk among each other, what they say, when they say it, and who they say it to. Another intersection of these challenges is the architecture defining the organization of these devices.

To promote inter/intra-operability, a flexible protocol is desired. A popular communication protocol and architecture is the Hypertext Transfer Protocol-based (HTTP) REpresentational State Transfer (REST) application programming interface (API), also referred to as "HTTP RESTful API." REST is a style of software architecture for distributed systems that may employ a standardized interface, such as HTTP. An application conforming to the REST constraints may be described as "RESTful".

In some implementations, HTTP RESTful API may use open standard formats. Two popular open standard formats include JavaScript Object Notation ("JSON") and Extensive Markup Language ("XML") data formatting. Both formats employ human-readable text to transmit data objects and, thus, provide a flexible and open scheme for communication. The trade-off for such open standard formats is verbosity.

HTTP is the foundation of data communication for the World Wide Web (commonly referred to as the "Web"), which is a system of interlinked hypertext documents accessible via the Internet. The Internet collectively describes an interconnected network of computers and networks. Although HTTP is not restrictive as a communication protocol, the usage of HTTP has been limited to unidirectional communication due to traffic routing devices and security devices, such as firewalls and Network Address Translation, employed with a computing and network infrastructure often employ security mechanisms.

HTTP polling is a typical technique used to overcome the unidirectional nature of HTTP across such Internet infrastructure. The technique provides firewall transparency and two-way communication, but at a tradeoff of high reply-message latency responsiveness, high bandwidth consumption, and high server utilization.

SUMMARY

In general overview, a vast number of computing devices connects to a computing platform that services data and information for the computing devices. This disclosure describes the usage of persistent connections, such as provided by WebSocket API protocols, to provide a low latency bidirectional connection between two nodes in a network.

To promote inter/intra-operability while reducing bandwidth usage over this connection, a messaging protocol is employed to serialized the binary data of messages constructed from data- and informational-models that are understood by the computing application operating at both the ends of the transmission node. For example, in some implementations, this protocol uses a binary representation of message- and metadata-constructs of existing dynamic REST API protocols. The protocol, in some implementations, is easily convertible to and from open standard formats, such as JavaScript Object Notation (JSON).

To promote ease of use of the protocol, the protocol may employ a similar request/response construct as HTTP, though in binary format. Layered on to of this is a RESTful style architecture that supports the reading/writing of data, executing remote procedures (services), event transport, and extended functionality such as file transfer and application tunneling.

To facilitate the transmission of large messages using a small fixed memory usage of each connection, the protocol chunks the message and reassembles them at the application level rather than at the transport level.

To reduce the memory requirement for the protocol, in some implementations, the protocol encodes a first portion set of a message with binary representations using symbols from a codebook library. In some implementations, the binary representation includes byte enumerations. The protocol may convert a second portion set of the message using standard data formats that are native to a given computing device. Examples of such standard data formats may include the Unicode characters, such as UTF-8.

In one aspect, the present disclosure describes a communication device including a port configured to receive binary data streams representing messages. Each of the data stream may include a binary header and a binary body. The binary body may have a metadata construct and a message construct in which the message construct includes one or more groups of data values. The metadata construct may include one or more groups of description values corresponding to a given data value of the one or more data values forming the message construct.

In some implementations, the communication device includes a memory that stores a first structural description of binary header and a binary body. The memory may also store a second structural description of the metadata construct. The binary header may be unencrypted where the binary body is encrypted.

In some implementations, the communication device may include a processor. The processor may parse a received binary data stream to reproduce a received message. The processor may parse the received binary data stream using the first structural description to determine the binary header and the binary body. The processor may parse the binary body using the second structural description to determine the one or more groups of description values forming the metadata construct. The processor may use a portion of the determined description values of the metadata construct to determine the one or more groups of data values of the message construct.

In some implementations, each of the one or more data values of the message construct and each of the one or more description value of the metadata construct may be delineated by a binary marker. The binary marker may be a single byte long. The binary marker may include a first value to define each beginning of a data value set or a description value set and a second value to define an end of each of the metadata construct and the message construct. The entire message construct may be delimited only with the binary marker.

In some implementations, each of the one or more groups of description values may form the metadata construct having a data-value name descriptor, a data-value description-descriptor, and a data value type-descriptor. The groups of description value, collectively, may form a definition for each of the data-value in the message construct. The metadata construct may precede the message construct in forming the binary body.

In some implementations, a portion of the metadata construct and a portion of the message construct correspond to a set of characters defined by a universal standard code.

In some implementations, the binary header is unencrypted, and the binary body is encrypted.

In one aspect, the present disclosure describes a method of using binary Dynamic REST message. The method may include storing, at a memory, a first structural description of the binary header and the binary body and a second structural description of the metadata construct where the metadata construct comprises one or more groups of description values corresponding to a given data value of the one or more data values forming the message construct. Each of the one or more data values of the message construct and each of the one or more description value of the metadata construct may be delineated by a binary marker.

In some implementations, the method may include receiving, at a port, a plurality of binary data streams representing a plurality of messages. The binary data streams may be received via Web sockets.

In some implementations, the method may include parsing, using a processor, each of the received binary data streams using the first structural description to determine the binary header and the binary body. The binary header is unencrypted, and the binary body is encrypted.

In some implementations, the method may include parsing, using the processor, the parsed binary body using the second structural description to determine the one or more groups of description values forming the metadata construct where the processor uses a portion of the determined description values of the metadata construct to determine the one or more groups of data values of the message construct. The metadata construct may include a data-value name descriptor, a data-value description-descriptor, and a data value type-descriptor. descriptor. The metadata construct may precede the message construct in forming the binary body. A portion of the metadata construct and a portion of the message construct may correspond to a set of characters defined by a universal standard code.

In one aspect, the present disclosure describes a non-transitory computer readable medium having instructions stored thereon, where the instructions, when executed by a processor, cause the processor to store, at a memory, a first structural description of the binary header and the binary body and a second structural description of the metadata construct where the metadata construct comprises one or more groups of description values corresponding to a given data value of the one or more data values forming the message construct. Each of the one or more data values of the message construct and each of the one or more description value of the metadata construct may be delineated by a binary marker.

In some implementations, the instructions, when executed, further cause the processor to receive, at a port, a plurality of binary data streams representing a plurality of messages. The binary data streams may be received via Web sockets.

In some implementations, the instructions, when executed, further cause the processor to parse, using a processor, each of the received binary data streams using the first structural description to determine the binary header and the binary body. The binary header is unencrypted, and the binary body is encrypted.

In some implementations, the instructions, when executed, further cause the processor to parse, using the processor, the parsed binary body using the second structural description to determine the one or more groups of description values forming the metadata construct where the processor uses a portion of the determined description values of the metadata construct to determine the one or more groups of data values of the message construct. The metadata construct may include a data-value name descriptor, a data-value description-descriptor, and a data value type-descriptor. The metadata construct may precede the message construct in forming the binary body. A portion of the metadata construct and a portion of the message construct may correspond to a set of characters defined by a universal standard code.

In one aspects, the present disclosure describes a communication device having a memory for storing a structural description of a message defined by a self-describing schema, where the structural description describes a structure interspersed by both one or more label elements and one or more punctuation elements among the data objects to describe a given message. The memory further stores a codebook having a set of binary symbols corresponding to the binary representations. The communication device may include a processor configured to generate a binary data stream to transmit to another computer device via a communication port. The processor may generate the binary data stream from a received message defined by the self-describing schema in which the received message may include one or more data objects delimited by one or more both label elements and one or more punctuation elements. The processor may parse the received message for one or more data objects according to the stored structural description. The processor may serially map each of the elements of a parsed data objects to a binary symbol defined in the codebook to produce a binary data stream where, when serially mapping each of the elements of the parsed data objects, the processor does not map the one or more label elements and one or more punctuation elements interspersed among the data objects in to the binary data stream.

In another aspect, the present disclosure describes a communication device including a port configured to transmit and receive a data stream via a persistent stateless connection. the persistent stateless connection may be over a web-socket connection.

In some implementations, the communication device may include a memory storing a dynamic REST API model.

In some implementations, the communication device may include a processor configured to connect to a second communication device over the persistent stateless connection. The processor formats a request message with the stored dynamic REST API model to produce a self-describing request message. The dynamic REST API model may include a data model that includes a data object, an event object, a service object, a property object, and an attribute object. The processor causes the self-describing request message to be transmitted over the port. The port may be a HTTP or HTTPS port having a value of 80 or 443. The self-describing request message may be presented in at least one of a JavaScript Object Notation (JSON) object and an Extensible Markup Language (XML) object. The self-describing request message may be formatted in a binary format. The self-describing request message may be encrypted.

In another aspect, the present disclosure describes a method of using dynamic REST messages with Web sockets. The method may include storing, at a memory of a device, a binary dynamic REST API model.

In some implementations, the method may include formatting, via a processor at the device, a request message using the binary dynamic REST API model to produce a self-describing request message.

In some implementations, the method may include transmitting, via a port of the device, the request message over a persistent state connection. The dynamic REST API model may include a data model that includes a data object, an event object, a service object, a property object, and an attribute object. The processor causes the self-describing request message to be transmitted over the port. The port may be a HTTP or HTTPS port having a value of 80 or 443. The self-describing request message may be presented in at least one of a JavaScript Object Notation (JSON) object and an Extensible Markup Language (XML) object. The self-describing request message may be formatted in a binary format. The self-describing request message may be encrypted.

In another aspect, the present disclosure describes a non-transitory computer readable medium having instructions stored thereon, where the instructions, when executed by a processor, cause the processor to store, at a memory of a device, a binary dynamic REST API model.

In some implementations, the instructions, when executed, further cause the processor to format, via a processor at the device, a request message using the binary dynamic REST API model to produce a self-describing request message.

In some implementations, the instructions, when executed, further cause the processor to transmit, via a port of the device, the request message over a persistent state connection. The dynamic REST API model may include a data model that includes a data object, an event object, a service object, a property object, and an attribute object. The processor causes the self-describing request message to be transmitted over the port. The port may be a HTTP or HTTPS port having a value of 80 or 443. The self-describing request message may be presented in at least one of a JavaScript Object Notation (JSON) object and an Extensible Markup Language (XML) object. The self-describing request message may be formatted in a binary format. The self-describing request message may be encrypted.

In yet another aspect, the present disclosure describes a method of abstracting a communication protocol using self-describing message. The method may include providing a first communication protocol and a second communication protocol in a memory of a device where the first communication protocol includes a number of control codes and binary messages having a self-describing schema. The self-describing schema may be of a data object model wherein instances of the second communication protocol are associatively mapped to the instances of the first communication protocol. The associative mapping between the first communication protocol and the second communication protocol may be stored in persistent memory.

In some implementations, the associative mapping of the control codes may be based on a HTML framework.

In some implementations, the associate mapping of the data message may be based on a service request selected from a group consisting of a GET request, a PUT request, a POST request, and a DELETE request.

The wireless connection may include a network selected from a group consisting of Zigbee, Bluetooth, WiMax, Wi-Fi, GSM, PCS, and D-AMPS, IEC, 6LoWPAN, Ant, DASH7, EnOcean, INSTEON, NeuRF ON, Senceive, WirelessHART, Contiki, TinyOS, GPRS, TCP/IP, CoAP, MQTT, TR-50, OMA LW M2M, ETSI M2M. The data object model may be structured in a dynamic REST API object model.

In some implementations, the method may include receiving, at a port of a computing device, a first instantiation of a message in the second communication protocol. The message may be received via a wireless connection.

In some implementations, the method may include classifying, by a processor of the computing device, the first instantiation of the message as being either a control message or a data messages.

In some implementations, the method may include translating, by a processor of the computing device, the first instantiation of the message to produce a second instantiation of the message where upon the message having been classified as a control message, the processor maps the control message to one or more control codes of the plurality of control codes and where upon the message having been classified as a data message, the processor maps the data message to a corresponding binary message having the self-describing schema.

In some implementations, the method may include transmitting, at the port of the computing device, the second instantiation of the message. The first communication device may transmit the second instantiation of the message to the platform server over a web-socket connection.

In yet another aspect, the present disclosure describes a system including a processor and a memory, the memory storing instruction that, when executed by the processor, cause the processor to provide a first communication protocol and a second communication protocol in a memory of a device where the first communication protocol includes a number of control codes and binary messages having a self-describing schema. The self-describing schema may be of a data object model wherein instances of the second communication protocol are associatively mapped to the instances of the first communication protocol. The associative mapping between the first communication protocol and the second communication protocol may be stored in persistent memory.

In some implementations, the wireless connection may include a network selected from a group consisting of Zigbee, Bluetooth, WiMax, Wi-Fi, GSM, PCS, and D-AMPS, IEC, 6LoWPAN, Ant, DASH7, EnOcean, INSTEON, NeuRF ON, Senceive, WirelessHART, Contiki, TinyOS, GPRS, TCP/IP, CoAP, MQTT, TR-50, OMA LW M2M, ETSI M2M. The data object model may be structured in a dynamic REST API object model.

In some implementations, the associative mapping of the control codes may be based on a HTML framework. In some implementations, the associate mapping of the data message may be based on a service request selected from a group consisting of a GET request, a PUT request, a POST request, and a DELETE request.

In some implementations, the instructions, when executed, further cause the processor to receive, at a port of a computing device, a first instantiation of a message in the second communication protocol. The message may be received via a wireless connection.

In some implementations, the instructions, when executed, further cause the processor to classify the first instantiation of the message as being either a control message or a data messages.

In some implementations, the instructions, when executed, further cause the processor to translate the first instantiation of the message to produce a second instantiation of the message where upon the message having been classified as a control message, the processor maps the control message to one or more control codes of the plurality of control codes and where upon the message having been classified as a data message, the processor maps the data message to a corresponding binary message having the self-describing schema.

In some implementations, the method may include transmitting, at the port of the computing device, the second instantiation of the message. The first communication device may transmit the second instantiation of the message to the platform server over a web-socket connection.

In yet another aspect, the present disclosure describes a non-transitory computer readable medium having instructions stored thereon, where the instructions, when executed by a processor, cause the processor to provide a first communication protocol and a second communication protocol in a memory of a device where the first communication protocol may include a number of control codes and binary messages having a self-describing schema. The self-describing schema may be of a data object model wherein instances of the second communication protocol are associatively mapped to the instances of the first communication protocol. The associative mapping between the first communication protocol and the second communication protocol may be stored in persistent memory.

In some implementations, the wireless connection may include a network selected from a group consisting of Zigbee, Bluetooth, WiMax, Wi-Fi, GSM, PCS, and D-AMPS, IEC, 6LoWPAN, Ant, DASH7, EnOcean, INSTEON, NeuRF ON, Senceive, WirelessHART, Contiki, TinyOS, GPRS, TCP/IP, CoAP, MQTT, TR-50, OMA LW M2M, ETSI M2M. The data object model may be structured in a dynamic REST API object model.

In some implementations, the associative mapping of the control codes may be based on a HTML framework. In some implementations, the associate mapping of the data message may be based on a service request selected from a group consisting of a GET request, a PUT request, a POST request, and a DELETE request.

In some implementations, the instructions, when executed, further cause the processor to receive, at a port of a computing device, a first instantiation of a message in the second communication protocol. The message may be received via a wireless connection.

In some implementations, the instructions, when executed, further cause the processor to classify the first instantiation of the message as being either a control message or a data messages.

In some implementations, the instructions, when executed, further cause the processor to translate the first instantiation of the message to produce a second instantiation of the message where upon the message having been classified as a control message, the processor maps the control message to one or more control codes of the plurality of control codes and where upon the message having been classified as a data message, the processor maps the data message to a corresponding binary message having the self-describing schema.

In some implementations, the method may include transmitting, at the port of the computing device, the second instantiation of the message. The first communication device may transmit the second instantiation of the message to the platform server over a web-socket connection.

In further yet another aspect, the present disclosure describes a communication engine including a communication port configured to receive one or more data streams, including a first data stream and a second data stream, wherein the data stream comprises a binary dynamic REST messages. The data stream may include one or more data fields where each of the data fields include a field value and a length identifier of the field value, the length identifier preceding a corresponding field value in each of the data fields. The communication port may receive the one or more input data stream over a web-socket connection. The message may include a data object having an event object, a service object, a property object, and an attribute object. Each of the one or more input data streams may include an identifier of a number of one or more data streams that form a given complete executable message. Each of the one or more data streams may include a message number identifier that indicate a location of a given decoded data stream within the complete executable message. Each of the one or more data streams may form a portion of a complete executable message.

In some implementations, the communication engine may include a first buffer to store a received first data stream and a received second data stream.

In some implementations, the communication engine may include a second buffer to store portions of a decoded message.

In some implementations, the communication engine may include a processor configured to decode the received data stream buffered within the first buffer to produce a given decoded portion. The processor may store the given decoded portion to the second buffer where the processor initiates decoding of the received first data stream buffered within the first buffer prior to a complete receipt of the received second data stream.

In some implementations, the communication engine may include a second buffer to store decoded portions of the one or more data streams having been buffered in the first buffer where the processor transmits a signal when the second buffer comprises each of the one or more data streams forming a given complete executable message.

In some implementations, the communication engine may include a decryption engine to decode an encrypted portion of the input data streams, which is encrypted.

In further yet another aspect, the present disclosure describes a method of using chunk-based communication of binary Dynamic REST message. The method may include receiving, at a port, one or more data streams, including a first data stream and a second data stream. The data stream may include one or more data fields where each of the data fields include a field value and a length identifier of the field value, the length identifier preceding a corresponding field value in each of the data fields. The communication port may receive the one or more input data stream over a web-socket connection. The message may include a data object having an event object, a service object, a property object, and an attribute object. Each of the one or more input data streams may include an identifier of a number of one or more data streams that form a given complete executable message. Each of the one or more data streams may include a message number identifier that indicate a location of a given decoded data stream within the complete executable message. Each of the one or more data streams may form a portion of a complete executable message.

In some implementations, the method may include storing, at a first buffer, a received first data stream and a received second data stream.

In some implementations, the method may include storing, at a second buffer, portions of a decoded message.

In some implementations, the method may include decoding, using a processor, the received data stream buffered within the first buffer to produce a given decoded portion. The processor initiates decoding of the received first data stream buffered within the first buffer prior to a complete receipt of the received second data stream.

In further yet another aspect, the present disclosure describes a non-transitory computer readable medium having instructions stored thereon, where the instructions, when executed by a processor, cause the processor to receive, at a port, one or more data streams, including a first data stream and a second data stream. The data stream may include one or more data fields where each of the data fields include a field value and a length identifier of the field value, the length identifier preceding a corresponding field value in each of the data fields. The communication port may receive the one or more input data stream over a web-socket connection. The message may include a data object having an event object, a service object, a property object, and an attribute object. Each of the one or more input data streams may include an identifier of a number of one or more data streams that form a given complete executable message. Each of the one or more data streams may include a message number identifier that indicate a location of a given decoded data stream within the complete executable message. Each of the one or more data streams may form a portion of a complete executable message.

In some implementations, the instructions, when executed, further cause the processor to store, at a first buffer, a received first data stream and a received second data stream.

In some implementations, the instructions, when executed, further cause the processor to store, at a second buffer, portions of a decoded message.

In some implementations, the instructions, when executed, further cause the processor to decode, using a processor, the received data stream buffered within the first buffer to produce a given decoded portion. The processor initiates decoding of the received first data stream buffered within the first buffer prior to a complete receipt of the received second data stream.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 3C shows an example HTTP REST API codes utilized by the API protocol library in accordance with an embodiment of the invention.

FIG. 6A illustrates an example encoded message generated by the binary dynamic REST API in accordance with an embodiment of the invention.

FIG. 6B illustrates the example REST message in a JavaScript Object Notation format.

DETAILED DESCRIPTION

Figure 1:
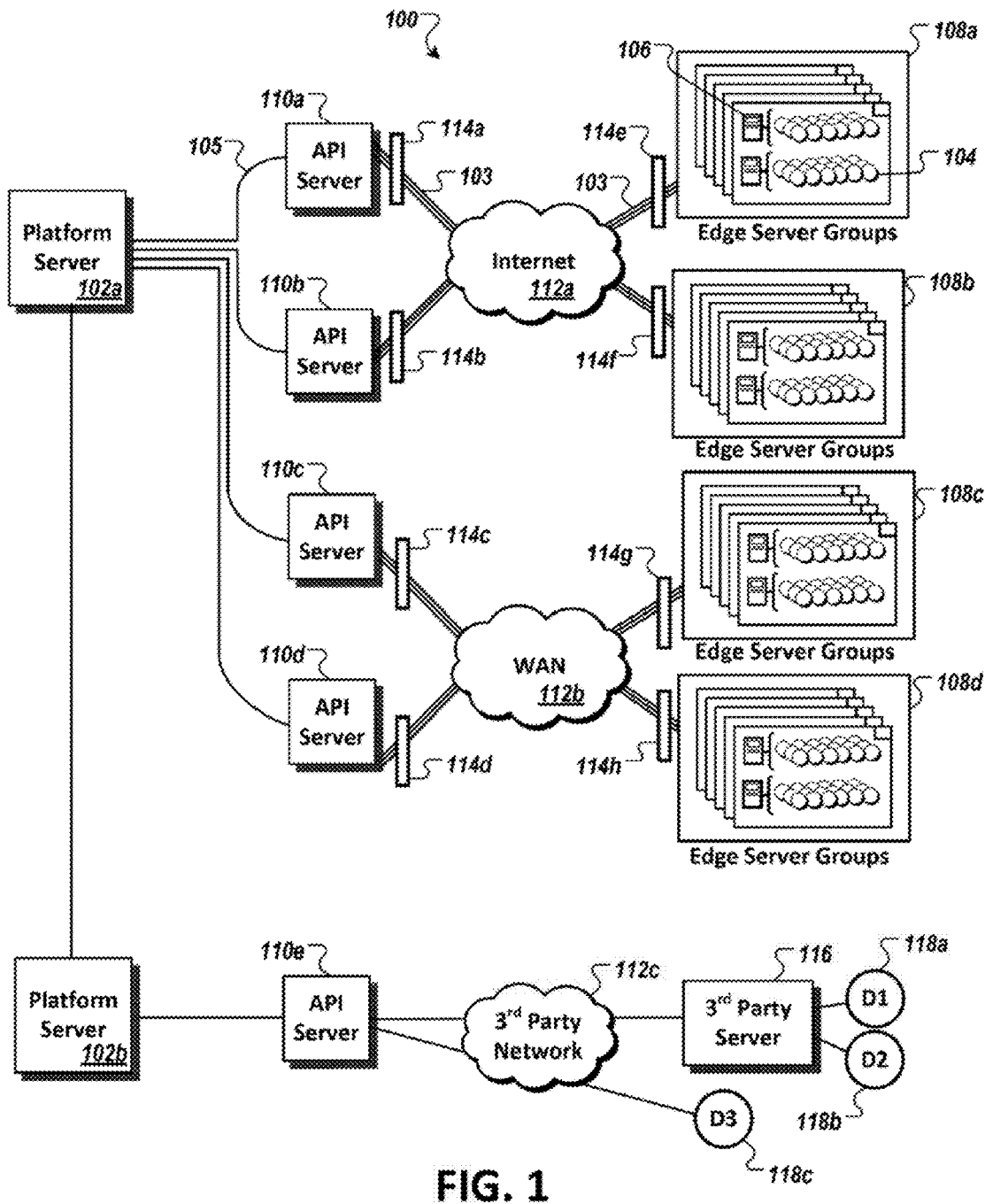
FIG. 1 is a block diagram of an example system for enabling communication between a platform server and a plurality of computing devices in accordance with an embodiment of the invention.

FIG. 1 is a block diagram of an example system 100 for enabling communication between a platform server 102 and a plurality of computing devices 104 in accordance with an embodiment of the invention. Each of the computing devices 104 connects to an edge server 106 that services and maintains communication with a group of computing devices 108.

A computing device 104, in some examples, is an electronic device that can communicate properties-, services-, and events-data and information relating a physical assets/devices, computer applications and systems, people, data objects, and platform services. In some implementations, the computing device 104 is a sensor or a machinery at an industrial complex; a computer or an office equipment at a business or government office; a point-of-sale machine at a market place or a vending machine; a construction equipment or a vehicle; a power generation or distribution equipment; a power substation or a transmission equipment; a building meter; a server; a networking or routing equipment; a smart appliance; an exercise machine; a medical device or a prosthesis device; a medical diagnostic device or a hospital equipment; a commercial vehicle or a transport container; a motor vehicle or an electric bicycle; a cellphone, a laptop, a tablet, an electronic reader; or a clothing electronic-tag.

While serving data and information for sets of computing devices 104, one or more edge servers 106 communicate to an intermediary server, referred to as an API server 110 (or "connection server 110"). In some implementation, the communication exchange occurs across a network infrastructure 112, such as the Internet 112a, a Wide-area network 112b, or a third-party network 112c. In turn, one or more API servers 110 communicate to the platform server 102. The platform server 102, the API servers 110, and the edge servers 106, collectively, form a distributed computing environment for serving data and information of the computing devices 104. In some implementations, a given API server 110 communicates to a set of edge servers 106 through a set of network security equipment 114 that secures the API server 110 and the platform server 102 from the network infrastructure 112 and that secures the groups of edge servers 106 and computing devices 104. For example, the network security equipment 114 may run a firewall or Network Address Translation (NAT) protocol.

Figure 2:
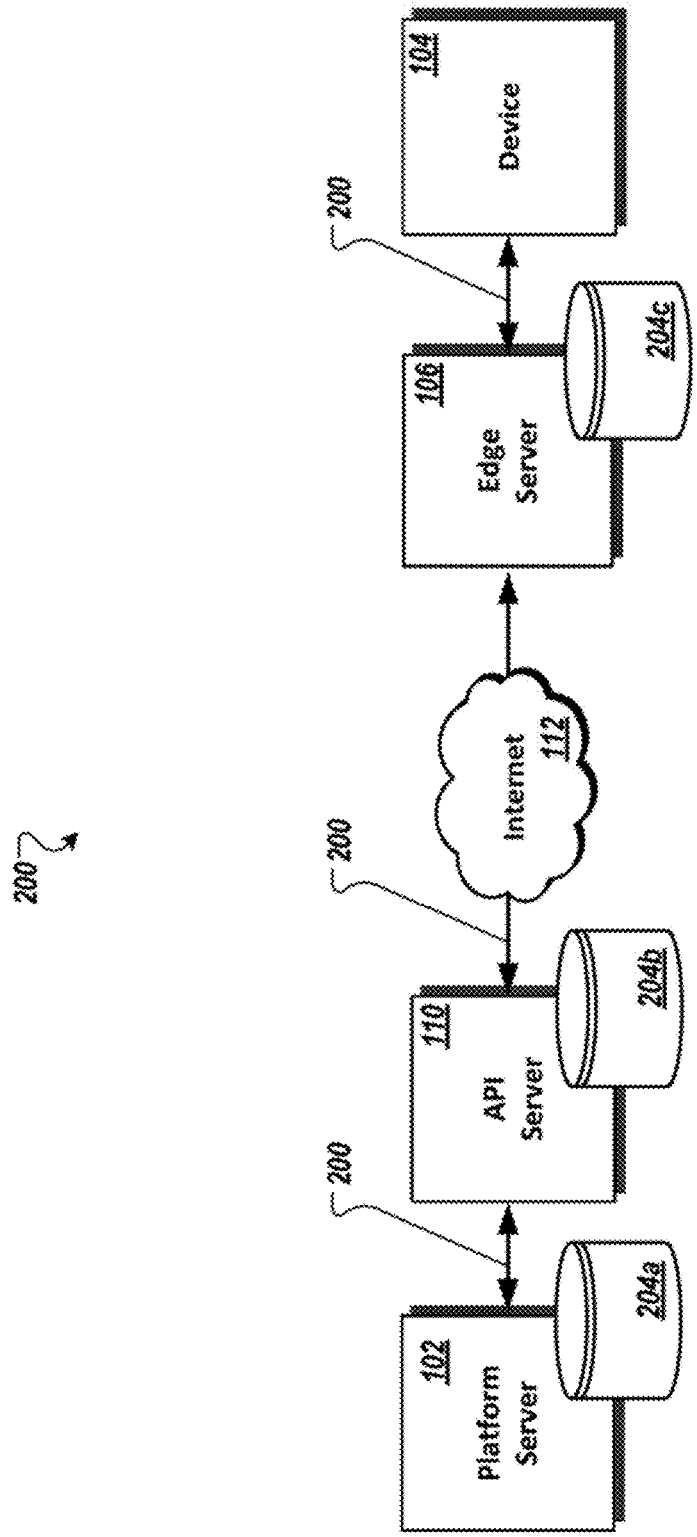
FIG. 2 is a block diagram of an example communication channel for transmitting and receiving messages formatted according to an API protocol in accordance with an embodiment of the invention.

FIG. 2 is a block diagram of an example communication channel 200 for transmitting and receiving messages 202 formatted according to an API protocol in accordance with an embodiment of the invention. The persistent communication channels 200 generally refer to persistent connections, such as the first persistent connection 103 and the second persistent connection 105, as described in relation to FIG. 1.

The platform server 102 runs a server-client application having an API protocol library 204 defining the API protocol. The edge server 106 runs a server-client application having the same API protocol library 204. To this end, messages being communicated between the platform server 102 and the edge servers 106 share, for the most part, the same structure. In some implementations, the same API protocol is employed among all of the components within the distributed computing environment.

This symmetry is intended to reduce the complexity of operation of the connection server 110 as the connection server 110 can service each communicated message in the same manner without much regard to the source or target.

The API protocol library 204 operates with a number of server-client application functions that dynamically generates application interfaces for servicing data and information. In some implementation, the application interface is based on a Dynamic REST API that generates binary message. In other implementations, the interface is based on JavaScript Object Notation ("JSON") or Extensive Markup Language ("XML") data formatting. Examples of usage of Dynamic REST APIs in a model-based development application is described in U.S. patent application Ser. No. 13/678,885, titled "METHODS FOR DYNAMICALLY GENERATING APPLICATION INTERFACES FOR MODELED ENTITIES AND DEVICES THEREOF," filed Nov. 16, 2012. The application is incorporated by reference in its entirety.

Figure 3A:
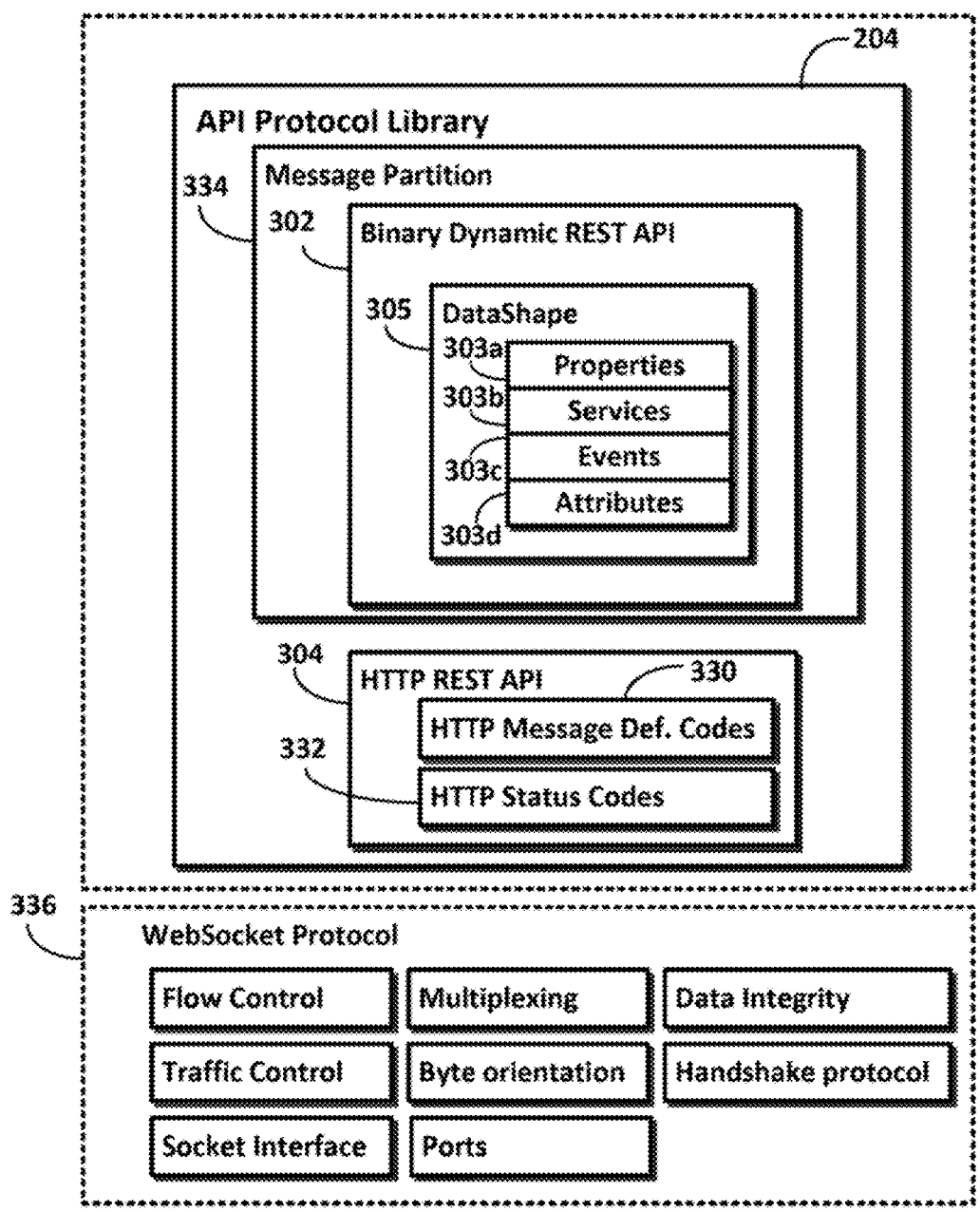
FIG. 3A is a block diagram of the API protocol library in accordance with an embodiment of the invention.

FIG. 3A is a block diagram of the API protocol library 204 in accordance with an embodiment of the invention. The API protocol library 204 includes a binary Dynamic-REST API component 302 and a fixed-HTTP REST API component 304.

The Dynamic REST API 302 employs a model-based schema to describe data and information in which the inputs and outputs of the schema is expressed in a self-describing textual data format, such as JSON or XML. The application interface is "dynamic" in that data and information are represented in an evolving and modify-able framework. Specifically, the application interface employs a series of characteristic definitions to describe types of information relating to a given entity, such as a physical asset/device, a computer application/system, a person, a data object, or a platform service.

In some implementations, the binary Dynamic REST API component 302 outputs serialized binary data representing data- and informational-models.

In some implementations, these characteristic definitions include a "property" definition 303a, a "service" definition 303b, an "event" definition 303c and an "attribute" definition 303d. Each of these characteristic definitions serves as an elementary building block in describing a model of the entity and is expressed as an abstract class that can inherit one or more classes, abstract classes, and data structures. The characteristic definitions are organized, collectively, in a template class with other characteristic definitions. To this end, a developer of applications to service data and information of a computing device may model an entity (also referred to as a "Thing") that represents a physical-world equivalent containing the complete set of data, services, events, historical activities, collaboration, relationships that define a Thing and its place in the organizational landscape.

In some implementations, a "Thing" is defined as an instance of a "Thing Template." A "Thing Template" is also an abstract class that can inherit from one or more "Thing Shapes." Properties, services, and events can be defined at the "Thing Shape", "Thing Template" or "Thing instance." If a "Thing Template" inherits from one or more "Thing Shapes", all of the properties, events, and services of the "Thing Shapes" are a part of the "Thing Template." When a "Thing instance" is created from a "Thing Template", all of the properties, events, and services of the "Thing Template" are realized within the "Thing instance."

In some implementations, data objects may be represented as "InfoTables" and "Streams." "InfoTables" and "Streams" may be beneficially described and defined by "DataShapes 305," which are reusable, abstract data object definitions. An "InfoTable" is similar to a relational database table, which represents a two dimensional data object (having columns and rows). A "Stream" is designed to capture time series data. Time series data is the data that is most often found as part of the communication flow for devices and machines. "Streams" and "InfoTables" also have services and events.

All of the entities can, based on authorizations, subscribe to any other entities events and can consume other entity services. When an entity is defined, it is immediately discoverable through a standard Representational State Transfer (REST) interface over HTTP or HTTPS. Therefore, the complete model namespace is available over a dynamic REST interface. Whatever a user defines the model to be appears as a REST interface. The REST interface for the model also includes a full description of the properties, services, and events for each entity. A service is a simple or complex function provided on a server, which is accessible to a State Representational State Transfer (REST) interface. A service has inputs, processing, and outputs. An event is a simple or complex change of data and/or status of an entity. An event has a well-defined complex data output that is sent to each event subscriber when the event is detected.

The dynamic REST interface is based on an inheritance or object oriented model. If a new service, property, or capability is defined at the "Thing Shape" or "Thing Template" level, each "Thing" instance that is derived from those entities immediately inherits that service, property or capability. The Dynamic REST API 302 employs this dynamic REST interface.

The REST interface for the namespace describes how to consume services for each entity in the model. As soon as a new "Thing" is defined in the model, the full set of services and data for the "Thing" is available as a set of REST interfaces.

Figure 3B:
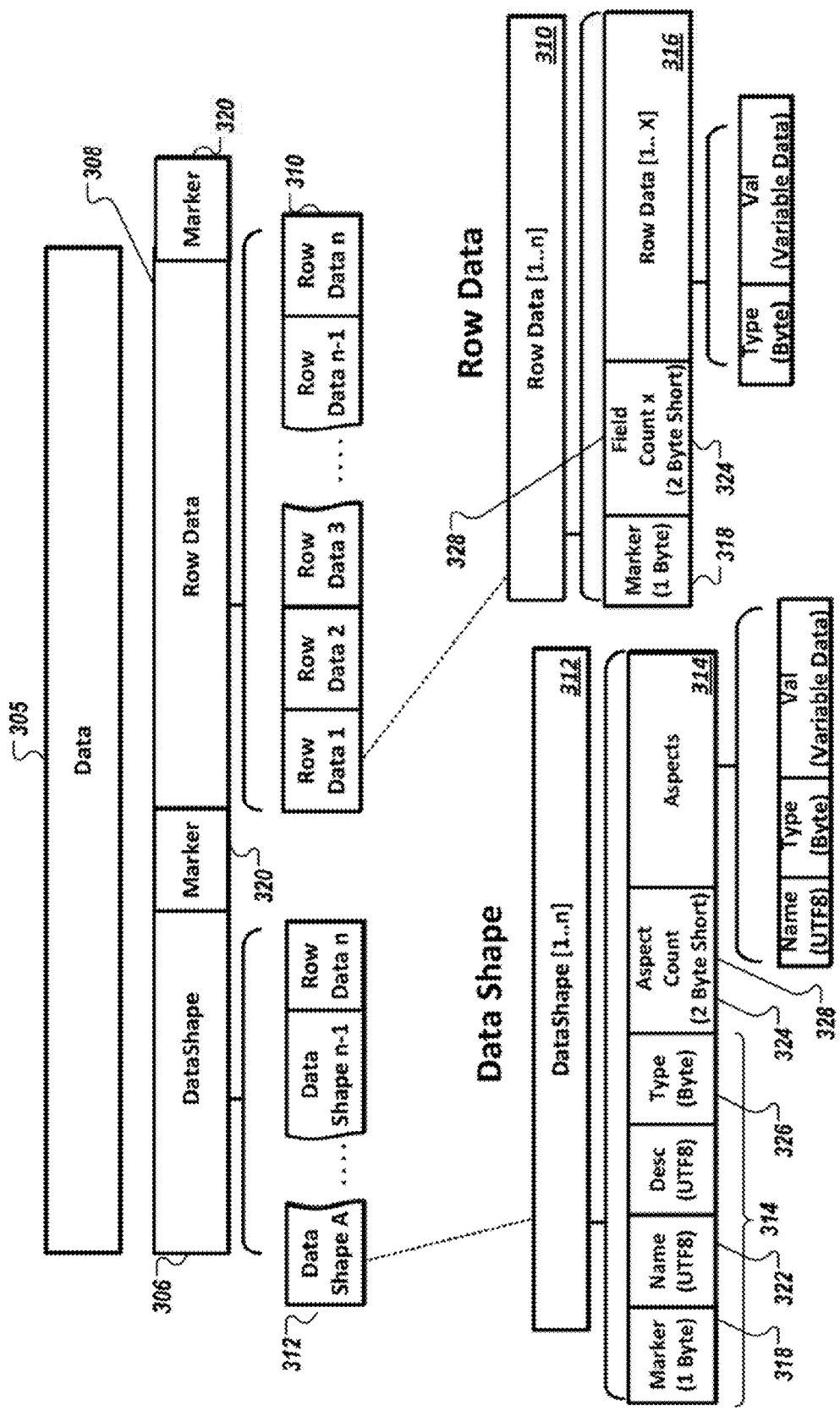
FIG. 3B shows an example structure of message output of the binary Dynamic REST API component in accordance with an embodiment of the invention.

FIG. 3B shows an example structure of message output of the binary Dynamic REST API component 302 in accordance with an embodiment of the invention.

A message generated from the binary Dynamic REST API may include a metadata construct and a message construct. The metadata construct describes a given structure of the message construct. Collectively, in some implementations, the metadata construct 306 and a message construct 308 forms a message body 307.

The message construct may include the actual data sets that a server-client application intends to transmit. In some implementations, these data sets are referred to as "Row Data 308". The datasets may include one or more data values 310. The metadata construct 306 may include one or more description sets 312 corresponding to a given data value forming the data set. The description sets 312 may include one or more description values 314. In some implementations, the metadata construct 306 is referred to as a "Datashape 306" where each of the description sets 312 forms a given field definition of the Datashape. Examples of field definitions may include a name, description, type, and aspects. These definitions describe a given data 316 in the Row Data 310.

In some implementations, the message generated from the binary Dynamic REST API preferably includes a first type of binary markers 318 to delineate each of the data sets 310 and each of the description sets 312. These binary markers 318 may mark the beginning of the data sets and the description sets. Additionally, each of the metadata construct and the message construct may include a second binary marker 320 to mark the end of the metadata construct 306 and the message construct 308.

In some implementation, each of the data sets 310 and the description sets 312 may include a data expressed as character strings 322, numbers 324, and enumerations 326. Character strings are text data. Numbers may include floating and fixed point numbers. Enumeration generally includes data types. Each character strings 322 may include a length-description field preceding the actual string value to provide a forward descriptor of the content. To this end, a given character string 322 in encoded form may be parsed without the complete character string 322 being available. To this end, groups of unknown data may include a count field 328 to identifier the number of such data to follow.

To reduce the memory requirement for the protocol, in some implementations, the protocol encodes a first portion set of a message using binary representations defined as symbols stored in a codebook library. In some implementations, the binary representation includes byte enumerations.

The protocol may convert a second portion set of the message using standard data formats that are native to a given computing device. Examples of such standard data formats may include the Unicode characters, such as UTF-8.

The message may be formatted as a binary string optimized for transmission using a WebSocket protocol.

Turning back to FIG. 3A, the HTTP REST API 304 may include messaging-type definition codes 330 and status codes 332 derived from the HTTP framework as defined the Hypertext Transfer Protocol application protocol version 1.1 (commonly referred to as "HTTP/1.1" or "HTTP") and published in IETF/W3C RFC 2616. The HTTP REST API codes are provided in FIG. 3C. Examples of status codes 332 include success code 332a, client error codes 332b, and server error codes 332c. Examples of messaging-type definition codes 330 include those related to device binding, authentication, and request messaging.

Figure 3D:
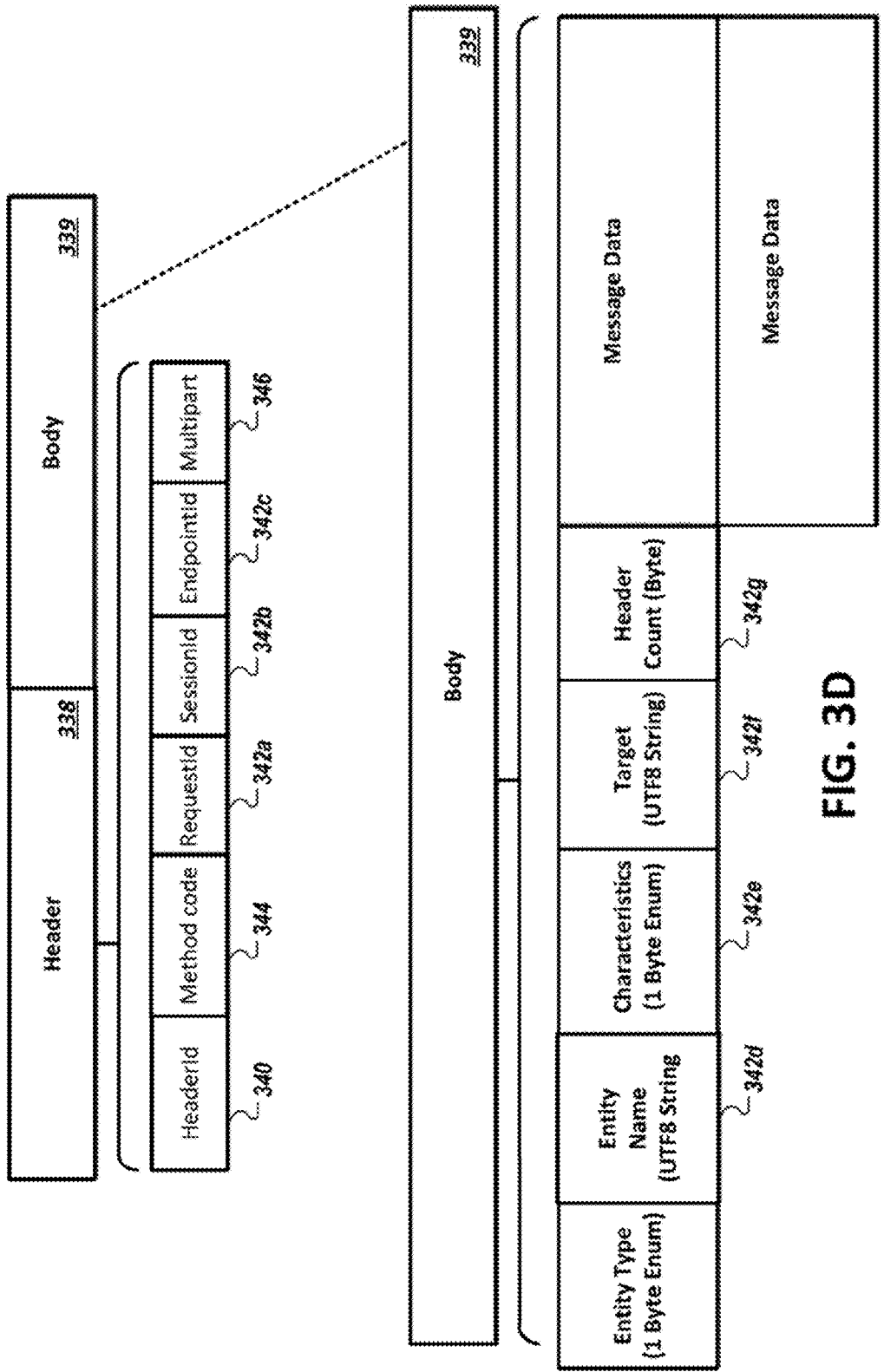
FIG. 3D shows an example structure of a message header utilized by the API protocol library in accordance with an embodiment of the invention.

In some implementations, the messaging-type definition codes 330 and status codes 332 may be a part of a message header 338 having routing information for the message. An example of the structure of the message header is shown in FIG. 3D. In some implementations, the message header 338 may include a header identification number 340, routing information 342 (such as request identification number 342a, session number 342b, and endpoint identification number 342c), and method codes 344. The method codes 344 may be used to specify the type of message located in the message content. The message header 338 may include a multipart marker 346 to indicate the message being a part of a collection of messages in which all of the data content of these messages form a single message.

Turning back to FIG. 3A, in some implementations, the API protocol library 204 may include a message partitioning module 334 for segmenting a given message into a fixed size for transport. The segmenting may facilitate the transmission of large messages using a small fixed memory usage for each of the connection. The message partitioning module 334 may chunk or partition a given message and reassemble them at the application level rather than at the transport level.

The API protocol library 204 may inject metadata, such as the length-description field for character strings 322 or the count fields 328, as described in relation to FIG. 3B, to allow parsing of a given message content without the complete message. That is, the metadata describes the content that is to follow. Using the message partitioning module 334, a given message generated by the binary Dynamic REST API 302 may be partitioned into chunks where each of the chunks may be decoded prior to the complete message is received.

To this end, a message of any length may be decoded using a buffer of only two message lengths for the decoding. In some implementation, the server-client side application may employ a fixed-buffer preferably between 1 Kbytes and 1 MBytes buffer, even more preferably between 4 Kbytes and 64 Kbytes, even more preferably between 4 Kbytes and 8 Kbytes.

Figure 3E:
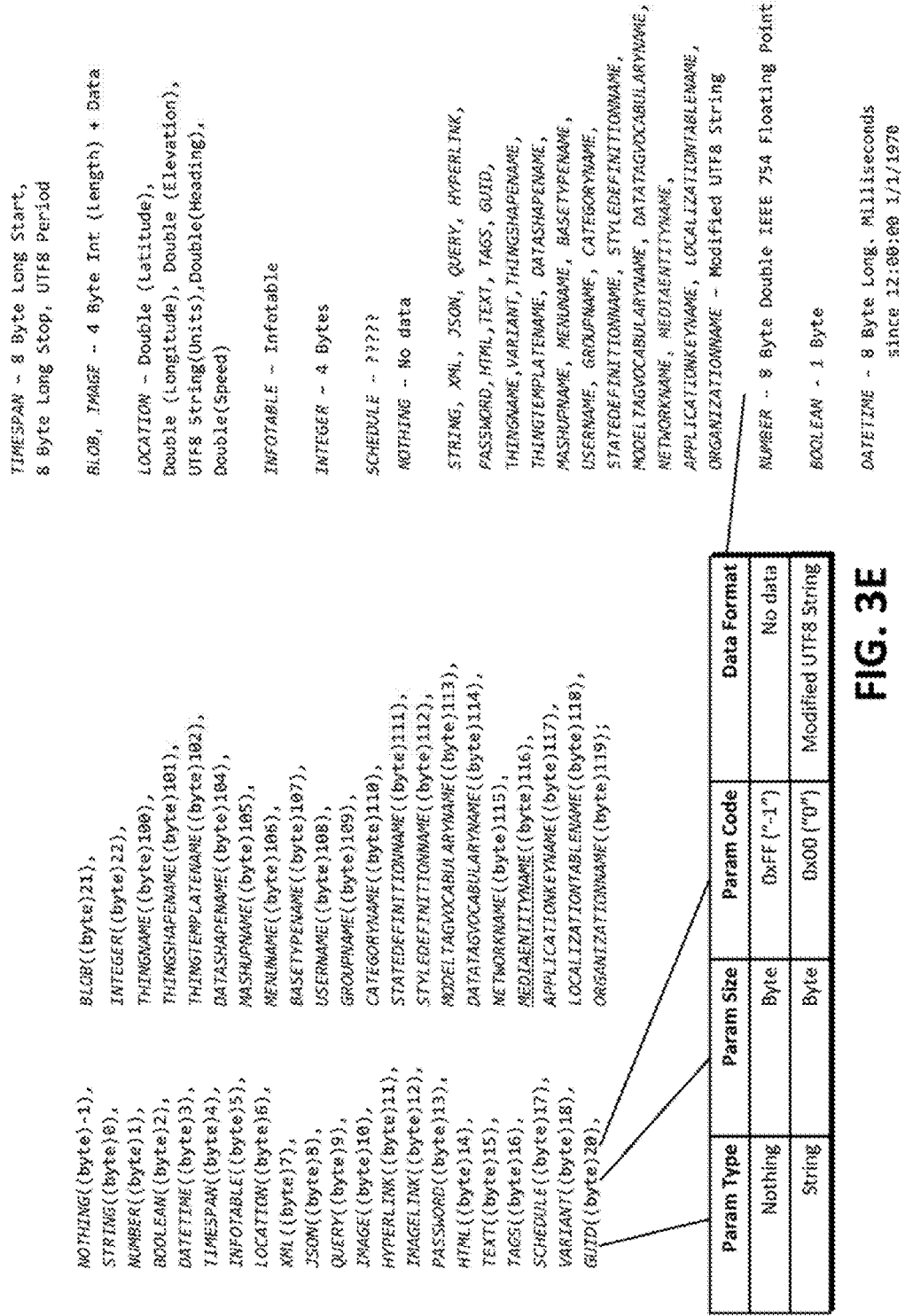
FIG. 3E is an example codebook of the API protocol library in accordance with an embodiment of the invention.
Figure 3F:
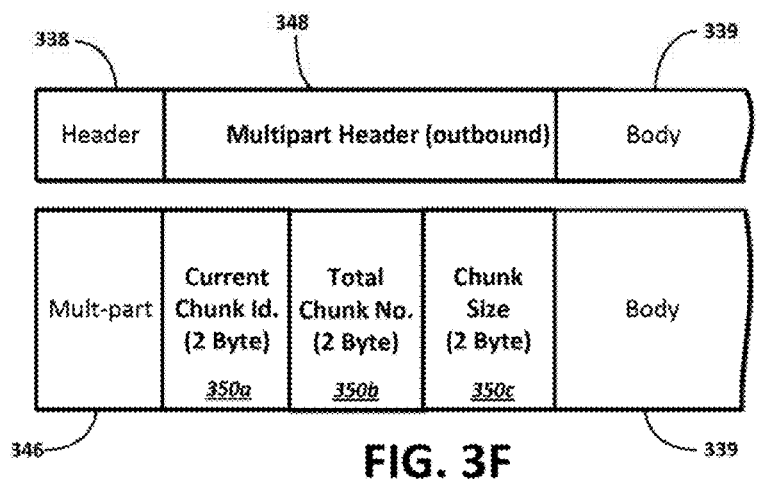
FIGS. 3F-3G show example structures of multi-part headers utilized by the API protocol library in accordance with an embodiment of the invention.
Figure 3G:
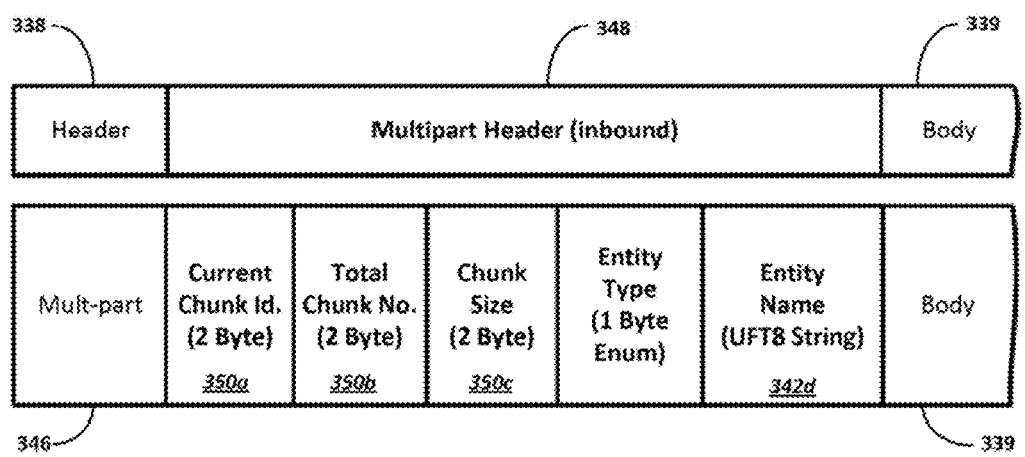
Figure 3H:
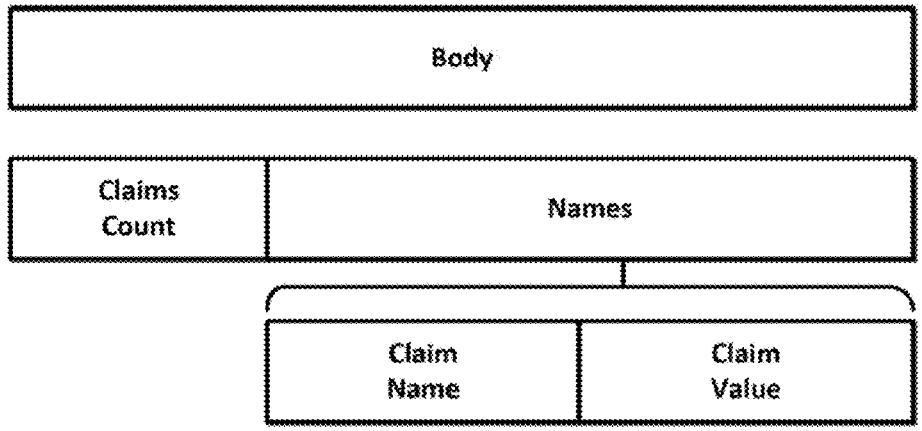
FIG. 3H shows an example structure of an authentication body utilized by the API protocol library in accordance with an embodiment of the invention.
Figure 3I:
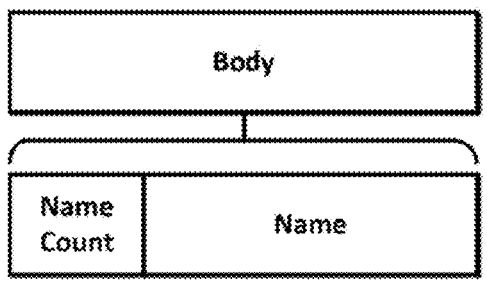
FIG. 3I shows an example structure of an binding and unbinding message body utilized by the API protocol library in accordance with an embodiment of the invention.

An example of the structure of the message multipart header is shown in FIGS. 3F and 3G. As shown in the figure, the message multipart header 348 may include a current chunk identification number 350a, a total chunk number 350b, and a chunk size identifier 350c. The message multipart header 348 may be inserted between the header 338 and the message body 339.

In some implementations, the API protocol library 204 may employ different message structures depending on the direction of message flow. For example, for an inbound message from a client-side application to the server-side application, the routing information 342d may be reproduced in the multi-part message header 348 to provide the destination information.

Turning back to FIG. 3A, in some implementation, the API protocol library 204 may be used in conjunction with the WebSocket API 336 to communicate the output message of the API protocol library 204 via WebSocket. WebSocket API 336 may be employed to stream messages on top of the Transmission Control Protocol (TCP). In some implementation, the WebSocket API 336 is a part of HTML5 WebSocket protocol. The message output of the API protocol library 204 may be configured to be entirely binary to further improve communication over the WebSocket API 336.

Figure 4:
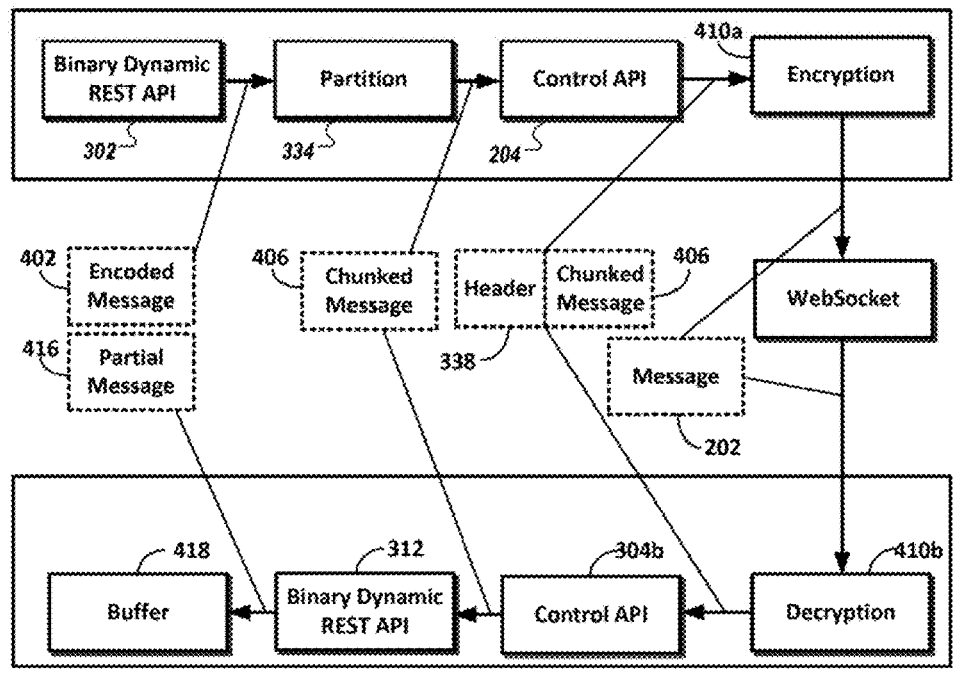
FIG. 4 is a block diagram of an example message transmission and reception using the API protocol library in accordance with an embodiment of the invention.

FIG. 4 is a block diagram of an example message transmission and reception using the API protocol library 204 in accordance with an embodiment of the invention. A client-server application 400a may call a function to transmit a message to another client-server application 400b. The call function may be a part of the API protocol library 204.

In some implementations, the binary Dynamic REST API 302 outputs a serialized binary stream corresponding to a self-described message.

FIG. 6A illustrates an example encoded message 402 generated by the binary dynamic REST API 302 in accordance with an embodiment of the invention. FIG. 6B illustrates the example encoded message 602 of FIG. 6A represented in a JavaScript Object Notation (JSON) format.

To this end, the example shows a reduction of over 50 percent of the message length compared to a JSON format message of the same message content. A typical JSON message is organized having an attribute-value pair delimited by colons ":" in which the pair values may be another nest attribute-value pair delimited by an open bracket "{" and a closed bracket "}". The attribute-value pair format provides a flexible schema to describe a message.

To improve the information efficiency of a given message, the binary dynamic REST API 302 may generate the message 402 with only the data object. The binary dynamic REST API 302 may store a structural description of the description values 314 that form the metadata construct 312, namely the DataShape 312. The description values 314, in turn, may provide a definition for the data values 316, namely the Row Data 316 in the message construct 310. In some implementations, the binary dynamic REST API 302 may inject a first binary markers 318 to mark the beginning of the data sets 310 the description sets 312 and a second binary marker 320 to mark the end of the metadata construct 306 and the message construct 308. To this end, the various punctuation and label elements such as those associated with JSON-base message may not be necessary to include.

Figure 7A:
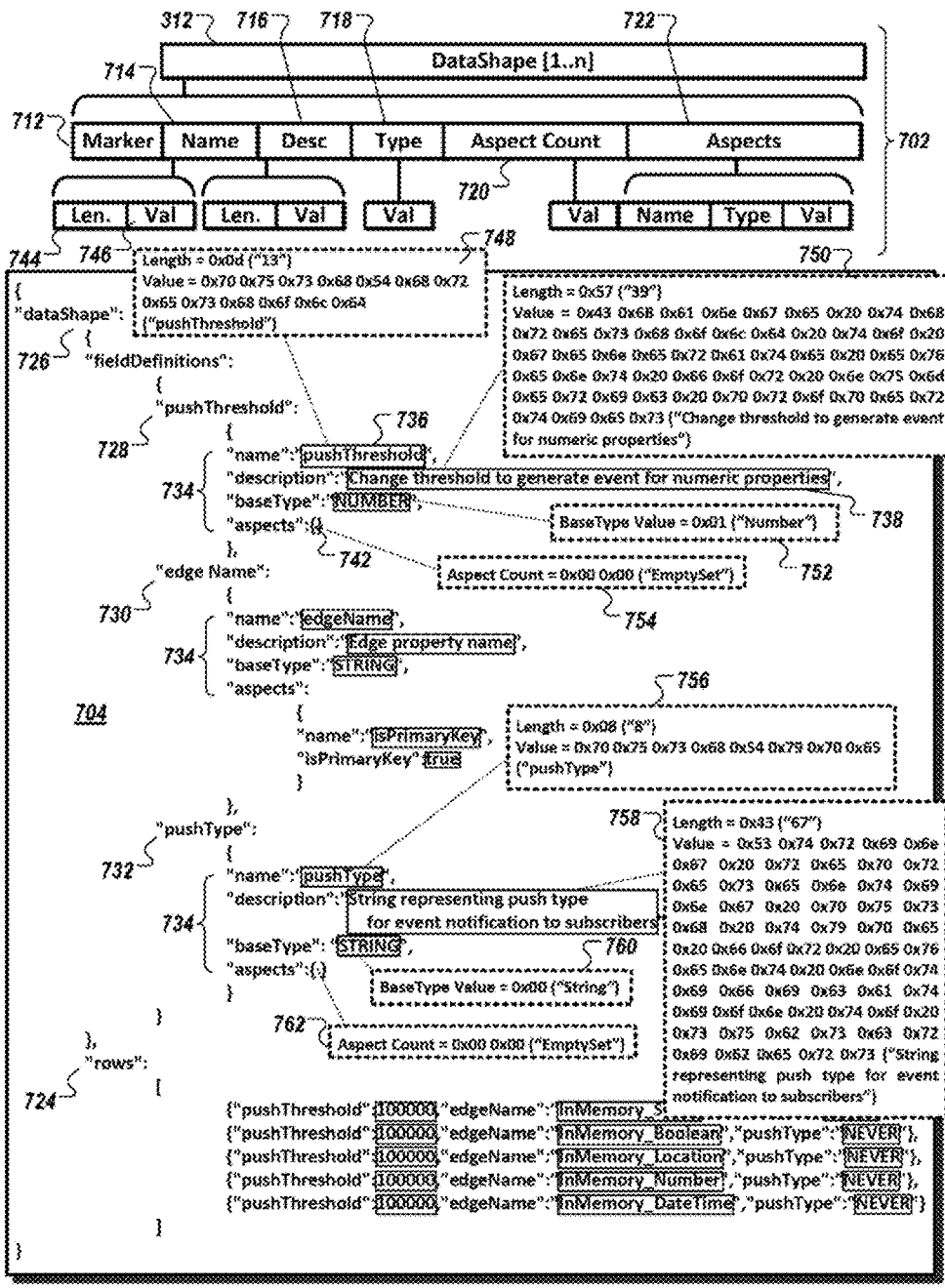
FIGS. 7A-7C illustrate an example method of generating a serialized binary Dynamic REST API message in accordance with an embodiment of the invention.
Figure 7B:
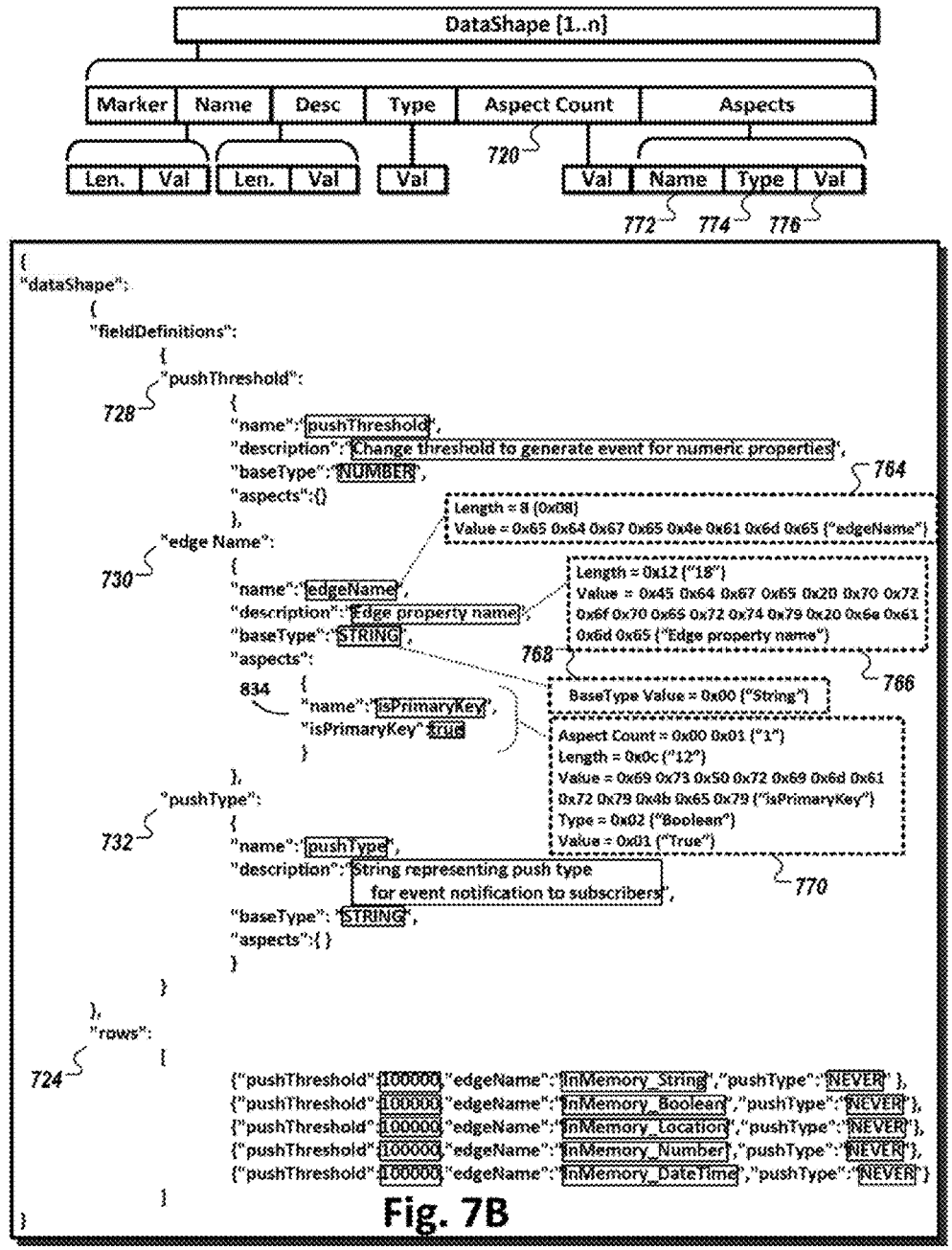
Figure 7C:
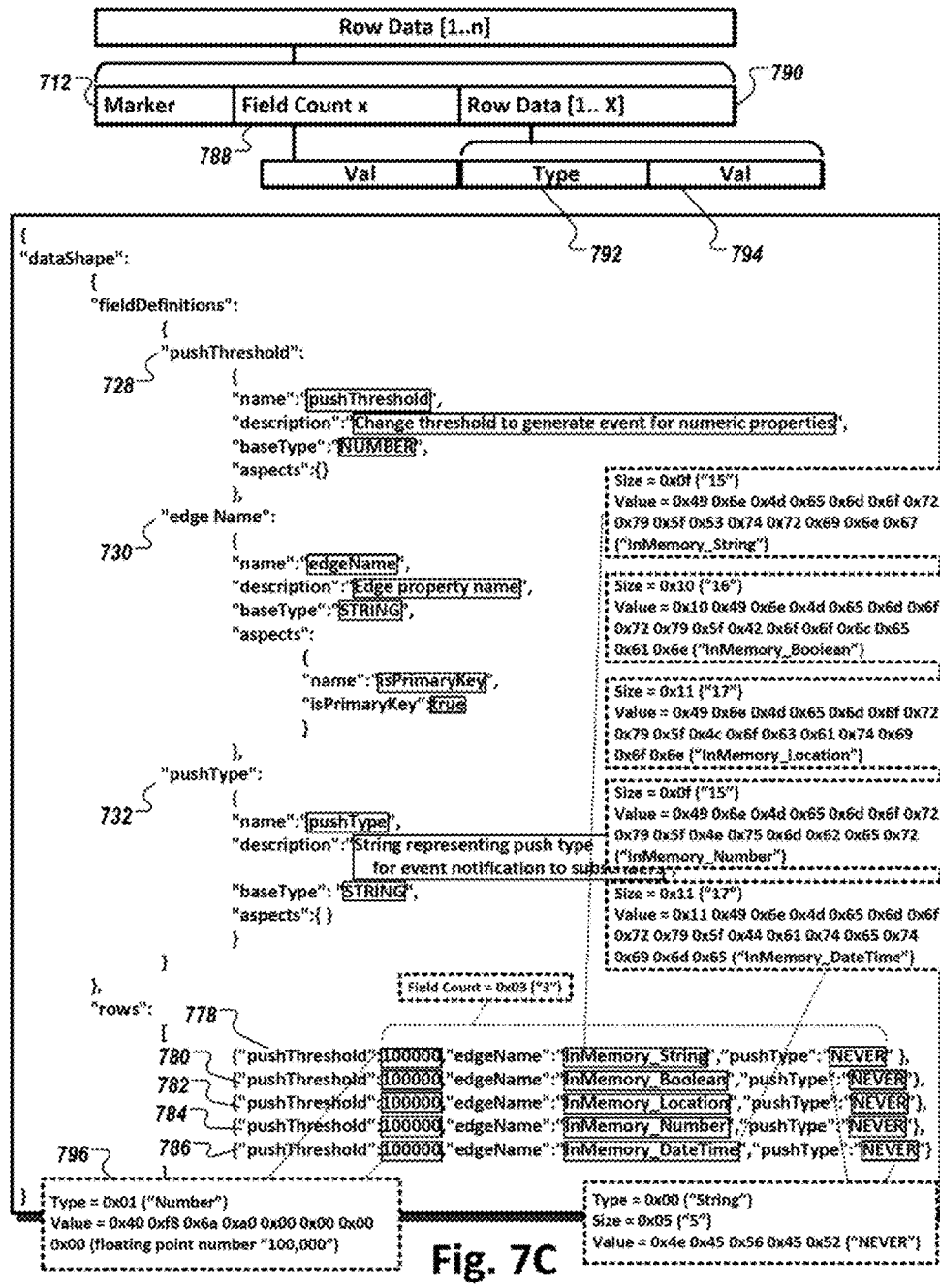

FIGS. 7A-7C illustrate an example method of generating a serialized binary Dynamic REST API message in accordance with an embodiment of the invention.

Specifically, FIGS. 7A and 7B show examples of generating a metadata portion of a message in accordance with an embodiment of the invention. FIG. 7C shows an example of generating the data portion of the message in accordance with an embodiment of the invention.

Turning now to FIG. 7A, the message structure of the metadata portion 702 is shown along with a marked-up 704 of the JSON message shown in FIG. 6B. The JSON message shows a self-describing message having a metadata construct and a message construct.

The metadata portion may include one or more field definitions corresponding to the "Datashape" 312, as described in relation to FIG. 3B. As indicated, each of the field definitions includes a marker field 712, a name field 714, a description field 716, a type field 718, an aspect count field 720, and an aspect field 722.

A given message construct may include groups of data values to which a given metadata construct may include one or more groups of description values that describes this group of data value. As described in relation to FIG. 3B, the message construct may refer to the "Row Data" (shown in the example as "rows" 724), and the metadata construct may refer to the "DataShape" (shown in the example as "datashape" 726).

As shown, the "datashape" 726 includes three field-definitions. Encoding of two of the three field-definitions ("pushThreshold" 728 and "push Type" 732) are discussed in FIG. 7A, and the third three field-definition ("edge Name" 730) is discussed in FIG. 7B.

As shown, each of the field definitions 728, 730, and 732 includes a group of description values 734 common to each other, namely "name", "description", "baseType", and "aspects". These description values are example implementations of a type of the characteristic definitions that may collectively form a template class of the model-based schema used by the dynamic REST API 302, as described in relation to FIG. 2.

As shown, each of the group of definitions has an "attribute"-"value" pair, as is the style of the JSON format. In encoding the message, only the "value" portion of the pair is used. The attribute is stored as part of a structural definition of the model-based schema that is incorporated into the binary dynamic REST API 302.

To generate a binary message of this JSON example message 602, in some implementations, a marker value is first added to the binary message. As discussed in relation to FIG. 3B, a marker 712 delineates each of the data sets (such as the "row data") of the message construct and each of the description sets (such as the "field definitions") of the metadata construct. The marker marks the beginning of the data sets and the description sets. Additionally, a second type of marker marks the end of the metadata construct and the message construct. In some implementations, the marker value may be a single digit binary value (i.e., "1" or "0").

In some implementations, a "name" value 736, a "description" value 738, a "baseType" value 740, and an "aspect" value 742 may follow the marker 712.

The "name" value 736 may be expressed as a character string. In the binary message, a given character string may be defined by a length identifier 744 that precedes the value 746 of the character string, which is expressed in UTF-8 format (Unicode standard). As shown, the character string "pushThreshold" has a length of "13" characters (which can be represented in hexadecimal code as "0x0d") and has a data value (in hexadecimal code) of "0x70 0x75 0x73 0x68 0x54 0x68 0x72 0x65 0x73 0x68 0x6f 0x6c 0x64" when expressed in UTF-8. This conversion is annotated in box 748. To this end, the hexadecimal value "0x0d 0x70 0x75 0x73 0x68 0x54 0x68 0x72 0x65 0x73 0x68 0x6f 0x6c 0x64" is appended to the binary message.

As shown, the "description" value 738 is a character string having "39" characters (hexadecimal code "0x57"). In UTF-8, the character string "Change threshold to generate event for numeric properties" is expressed, in hex-value, as:

0x43 0x68 0x61 0x6e 0x67 0x65 0x20 0x74 0x68 0x72
0x65 0x73 0x68 0x6f 0x6c 0x64 0x20 0x74 0x6f 0x20
0x67 0x65 0x6e 0x65 0x72 0x61 0x74 0x65 0x20 0x65
0x76 0x65 0x6e 0x74 0x20 0x66 0x6f 0x72 0x20 0x6e
0x75 0x6d 0x65 0x72 0x69 0x63 0x20 0x70 0x72 0x6f
0x70 0x65 0x72 0x74 0x69 0x65 0x73.

As shown, the "baseType" value 740 is represented as a type of data format. In some implementations, the data format information is preferably expressed as a binary symbol that is defined in a codebook composing a portion the API protocol library 204. FIG. 3E is an example codebook of the API protocol library 204 in accordance with an embodiment of the invention. In some implementations, the binary symbol is preferably 8 bits long. This conversion is annotated in box 752.

As shown, the "aspects" value 742 is a number. In some implementations, the "aspects" value is a two byte SHORT (i.e., having two bytes, each being 4 bits in length). Here, the value is NULL or EMPTY and is expressed, in hex-value, as "0x00 0x00." This conversion is annotated in box 754.

In some implementations, this process of appending binary representations of the group of definitions to form the metadata construct is repeated for the entirety of the message 602. To this end, the various data-values of the "edge Name" and "pushType" field-definitions are appended to the binary message. The values of these data-values are provided in annotated box (756, 758, 760, 762, 764, 766, 768, and 770). In some implementations, an end marker (e.g., code "0x00") follows the data-values to delineate the end of the message construct. In some implementations, the sequencing of the field-definitions in the binary message is not relevant as each of the field-definitions is described as its "name" value.

Referring to FIG. 7B, in some implementations, a group of aspect value may be nested within the group of data-values. The aspect count field 720 may define number of such groups. In some implementations, each of the aspect groups may include an "aspect name" value 772, an "aspect type" value 774, and an "aspect data" value 776. Encoding of a given aspect-group may be similar to encoding of the other group in which, for example, character strings are preceded by a length identifier, and data types are expressed as binary symbols. In some implementations, the "aspect name" value is a character string; the "aspect type" value is a data type; and the "aspect data" value is a value having a format described by the "aspect type" value.

Referring now to FIG. 7C, encoding of the message construct of the example message 602 is described. As discussed in relation to FIG. 3B, the metadata construct describes a given structure of the message construct. To this end, in some implementations, each of the Row Data 316 of the message construct may be described by the description values 314 enunciated in the metadata construct.

As shown, the metadata construct includes three field definitions, namely a "pushThreshold" field definition 728, an "edge Name" field definition 730, and a "pushType" field-definition 732. To this end, the "Row Data" (778, 780, 782, 784, and 786) is preferably structured according to these field definitions 728, 730, 732.

In some implementations, a "Row Data" may include a marker 712, a row-count field 788, and a number of data groups 790 corresponding to the number of row-count field 788. Each of the data groups 790 may include a data type field 792 and a value field 794.

As shown, "Row Data" 778 includes a "pushThreshold" value "100000", an "edge Name" value "InMemory_String", and a "pushType" value "NEVER".

As defined by the "pushThreshold" field-definition 728, the value "100000" is a "NUMBER." In some implementations, a number is expressed as an 8-byte DOUBLE. To this end, the value "100000" is equivalent to hex-value "0x40 0f8 0x6a 0xa0 0x00 0x00 0x00 0x00", as is shown in box 796.

The "edge Name" and "pushType" data are character strings, as defined by their respective field-definitions 730 and 732, and may be encoded in the manner described above.

In some implementations, binary representations of the Row Data are appended to form the message construct for the entirety of the message 602.

Of course, other means of generating a binary Dynamic REST message may be employed.

Turning back now to FIG. 4, subsequent to the binary Dynamic REST API 302 generating the serialized binary stream, the message partitioning module 334 of the API protocol library 204, as described in relation to FIG. 3A, may partition the encoded message 402 into a number of chunked messages 406.

The segmenting may facilitate the transmission of large messages using a small fixed memory usage of each of the connection. In some implementations, the message partitioning module 334 may chunk or partition a given message and reassemble them at the application level rather than at the transport level.

Moreover, the API protocol library 204 may inject metadata, such as the length-description field for character strings 322 or the count fields 328, to allow parsing of a given message content without the complete content object. To this end, a given message generated by the binary Dynamic REST API 302 may be partitioned into chunks where each of the chunks may be decoded prior to the complete message is received.

Figure 8:
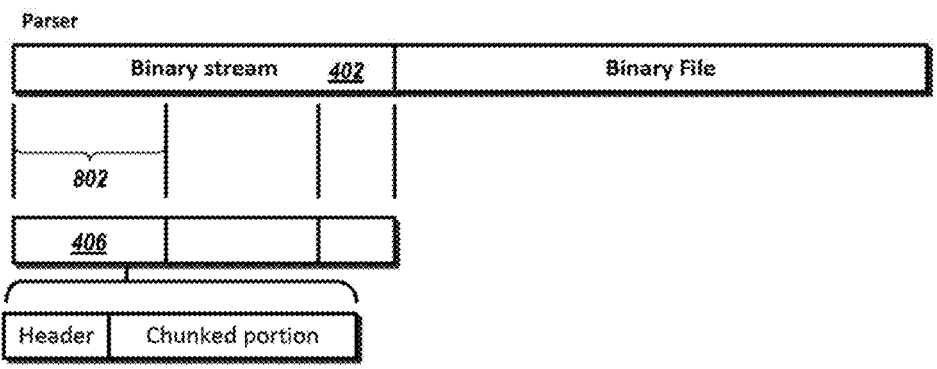
FIG. 8 illustrates an example method of partitioning an encoded message in accordance with an embodiment of the invention.

FIG. 8 illustrates an example method of partitioning an encoded message in accordance with an embodiment of the invention. The message partitioning module 334 may partition the encoded message 402 into a number of chunked message 406. In some implementations, the length of the message may be fixed or variable.

In some implementations, the message partitioning module 334 may inject metadata information relating to the partitioning into a header, such as, for example, the multipart header. FIGS. 3F-3G show example structures of multi-part headers utilized by the API protocol library 204 in accordance with an embodiment of the invention. In some implementations, the multi-part header may include a chunk-message identification number 350a, a total number of chunks 350b forming the message, and a chunk size 350c of a given chunked message. To this end, the message may be decoded in any order as the identification number allows for assembly of the chunks in any sequence. Moreover, the total number of chunk message allows the assembler to know the end of the message based on the number of chunks received. Moreover, the chunk size allows the chunked messages to be of variable length as defined by the size identifier.

In certain implementations, routing information 342d (see FIG. 3D) may be included in the multi-part message 348 to assist with the routing of the message, such as for outbound messages being transmitted from the platform server 102. The other implementations, the routing information may be included for inbound messages.

In some implementations, the message partitioning module 334 includes a buffer window having a size preferably between 4 Kbytes and 1024 Kbytes, even more preferably between 8 Kbytes and 16 Kbytes. For large files 804, the binary Dynamic REST API 302 may employ an external file transfer protocol that may operate independently of the binary Dynamic REST API 302 to transact the data exchange.

Turning back now to FIG. 4, subsequent to the message partitioning module 334 partitioning the encoded message 402 into one or more chunked messages 406, the API protocol library 204 packages the chunked message 406 with metadata information about the message in the message's header 338 and message's body 304 of the message.

The API protocol library 204 may add identity and target metadata information to the message's header and the message's body. The API protocol library 204 may encrypt the message using an encryption module 410a defined, in some implementations, within the API protocol library 204. The encrypted portion may include the entire message or a portion of the message.

Examples implementations that employ metadata information in the message's header and body is described in co-pending, concurrently filed U.S. patent application, titled "SYSTEM AND METHOD OF MESSAGE ROUTING USING NAME-BASED IDENTIFIER IN A DISTRIBUTED COMPUTING ENVIRONMENT", filed Mar. 21, 2014, naming inventors Rick Bullotta, John Canosa, Bob DeRemer, and Mike Mahoney, and having attorney docket no. 2009132-0032. The application is incorporated by reference herein in its entirety.

FIG. 3D shows an example structure of a message header utilized by the API protocol library 204 in accordance with an embodiment of the invention. In some implementations, the header 338 may include a request identification number 342a that is associated to a given message. In some implementations, the request identification number 342a is preferably a 24-digit long binary number with the most-significant digit (MSB) first, though it can be of various data length and endian.

In some implementations, the header 338 may include a session identification number 342b that is associated to a given name identifier belonging to a particular computing device 104. In some implementations, the session identification number 342b may be used by a given connection server 110 to determine binding path of a given computing device 104. In some implementations, the session identification number 342b is preferably a 32-digit long binary number with the most-significant digit (MSB) first, though it can be of various data length and endian.

In some implementations, the header 338 may include an endpoint identification number 342c that is associated to routing information for a given persistent connection 200. The endpoint identification number 342c is preferably a 32-digit long binary number with the most-significant digit (MSB) first.

In some implementations, the header 338 may include a message type field 344, referred to as a "Method code 344." For request type messages, the message type field 344 may include a code corresponding to the request type message. In some implementations, the request type message may be based on an HTTP framework and, thus, may include a "GET" request, a "POST" request, a "PUT" request, or a "DELETE" request.

In some implementation, the metadata information may include an "entity name" 342d (corresponding to the source of the data or request), a "characteristic" field 342e, a "target name" 342f (corresponding to an intended recipient of the data or request), and a number of message count 342g.

In some implementations, the API protocol library 204 may generate message produced from the multiple binary Dynamic REST API 302.

Turning back now to FIG. 4, in some implementations, the client- or server-side application may employ a Web-Socket protocol to transmit the output message 202 of the API protocol library 204 to a corresponding client- or server-side application. The corresponding client- or server-side application may be running a mirroring API protocol library 204 to decode the message.

To decode the received message 202, the encrypted portion of the received message 202 may be decrypted via a decryption module 410b. As indicated, the encrypted portion may include the entire message or a portion of the message. The decryption module 410b may return a decrypted message having the header 338 and the chunked message 406.

The API protocol library 204 may receive the header 338 and parse the method code field 334 of the header 338 to determine the type of message. In certain instances in which the method code field 334 includes a HTTP request code 330, the API protocol library 204 may send the message body for further processing.

To decode a request message, in some implementations, the API protocol library 204 processor may parse the chunked message 406 using marker identifiers, length identifier, field type identifier, and field counts identifier to retrieve the group of field definitions and message construct may include groups of data values. In some implementations in which all of the information needed to parse a given encoded portion of the message immediately precedes the encoded data, the API protocol library 204 may parse the message in portions (or chunks) without having to wait for the entirety of the message. In instances in which the message was chunked, the partial decoded message is stored in a buffer 418. Upon the message being decoded in its entirety, the API protocol library 204 may signal the buffer 418 or the client-server application to retrieve the complete message to be serviced by the client-server application 401b.

To perform the decoding in its entirety, the first encoded data stream may be organized with a known DataShape and may include metadata to describe unrestrictive elements within the data stream. In some implementations, the metadata may include forward descriptors of an unrestrictive element. Unrestrictive element may include objects having variable number of elements. This can include textual information, such as strings of text as well as variable numbers of objects. Unrestrictive element may also include the variable number of chunked message portions that constitute the entire message. The metadata may include markers to identify separations between the various DataShape.

In being able to decode partial messages independent of one another, the client-side application may be implemented as a light-weight application. A small-fixed decoding buffer typically reduces the cost of implementation for a given device.

Figure 9:
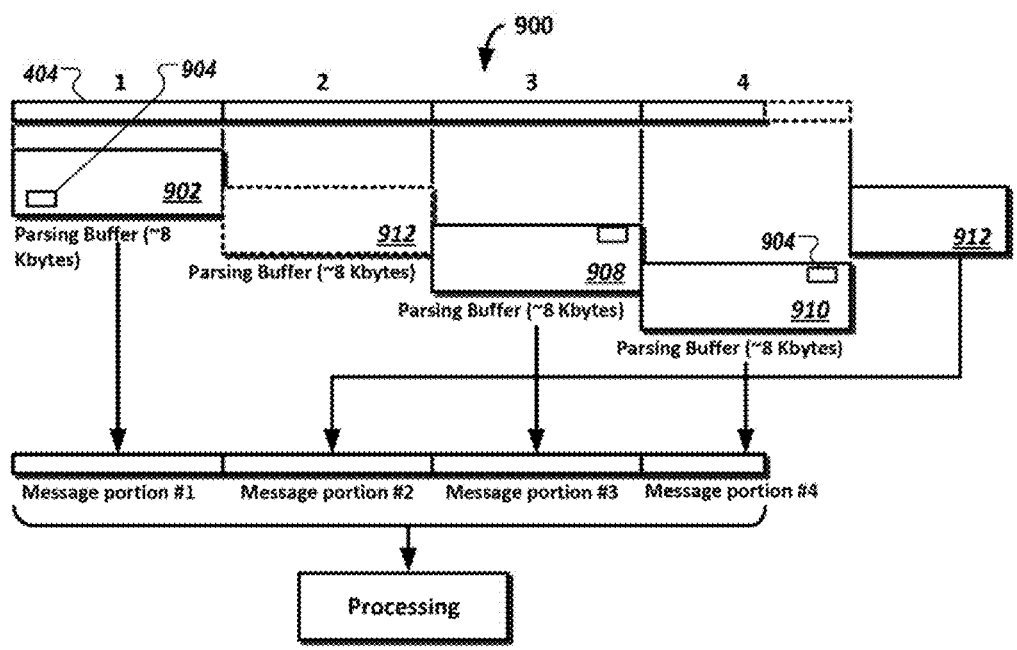
FIG. 9 is a flowchart of an example method of reassembling a message in accordance with an embodiment of the invention.

FIG. 9 is a flowchart of an example method 900 of reassembling a message 404 in accordance with an embodiment of the invention. The edge server 106 may receive a first encoded data stream 902 (which is a part of the message 404) and decodes the stream 902 in its entirety. The edge server 106 may index the decoded portion of the message with an identifier 904 corresponding to the number of chunked messages. The identifier 904 may be the current chunk identification number 405a employed in the multipart header 405 (see FIGS. 3F and 3G).

The edge server 106 may continue to receives the subsequent encoded data streams 906, 908, and 910. The edge server 106 continues to index the decoded portions 906, 908, and 910 of the messages 404 in the memory.

If a message chunk 912 was corrupted or not received, the edge server 106 may wait for a retransmission of the missing chunk message 1112. Using the chunk identifier 1104, the edge server 106 can decode a given received encoded data stream out of its sequence from with the message 404.

Figure 5:
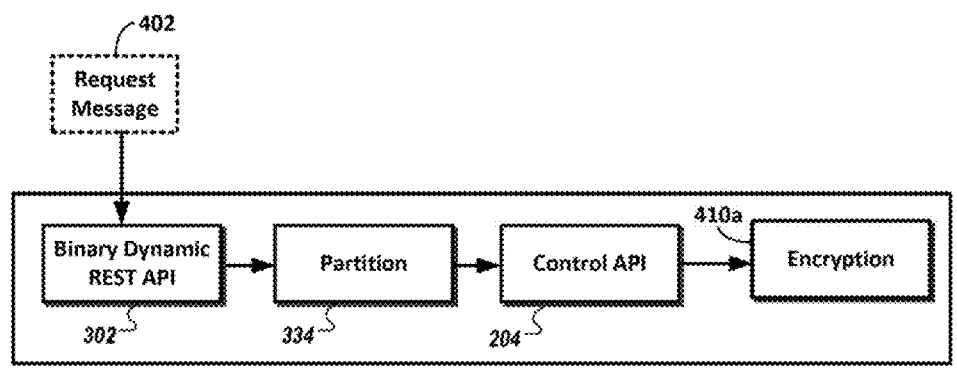
FIG. 5 is a block diagram of an example of a message transmission and reception using the API protocol library in accordance with an alternative embodiment of the invention.

Alternatively, the API protocol library 204 may be employed as an encoder or decoder. FIG. 5 is a block diagram of an example of a message transmission and reception using the API protocol library 204 in accordance with an alternative embodiment of the invention. In this embodiment, a client- or server-side application sends a message 402 to the API protocol library 204. The message 402 may be formatted in a human-readable text-language format. Examples include, for example, JSON and XML. The message 402 may include data objects delimited by one or more data objects.

The binary Dynamic REST API 302 may parse through the message 402 to retrieve one or more data objects according to the stored structural description, as shown and described in FIGS. 7A to 7C. The binary Dynamic REST API 302 may serially map each of the elements of a parsed data objects to a binary symbol that is defined in the codebook to produce a binary data stream.

Figure 10:
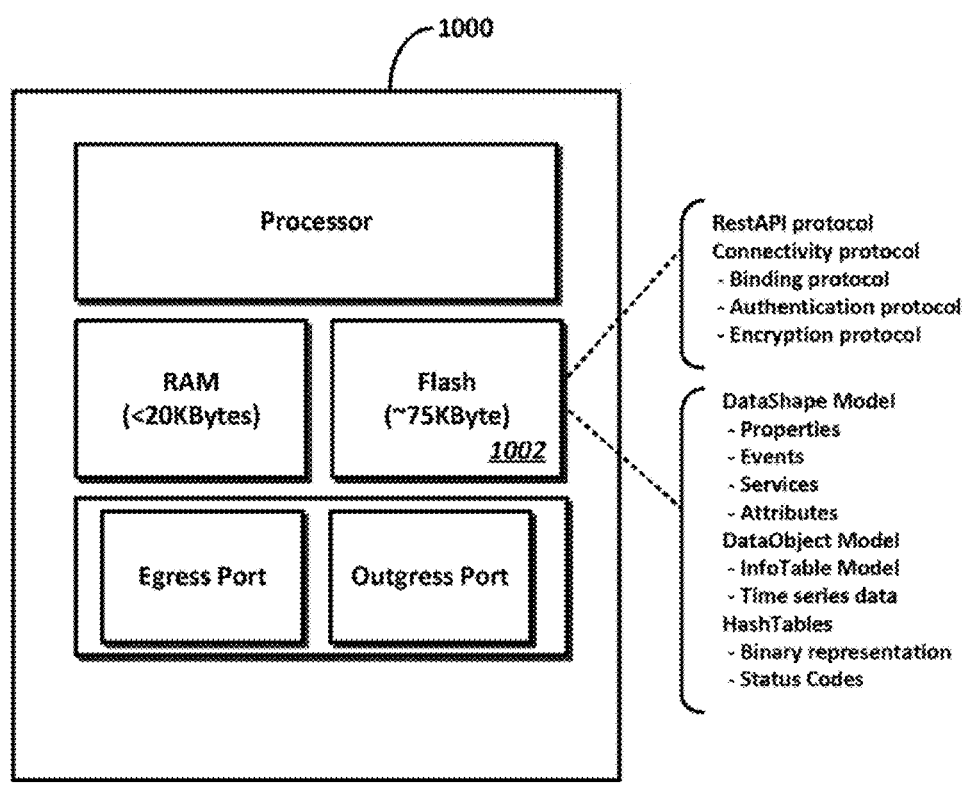
FIG. 10 is a block diagram of an example computing device running a client-application that is executing a software development kit (SDK) using the API protocol library in accordance with an embodiment of the invention.

FIG. 10 is a block diagram of an example computing device 104 running a client-application that is executing a software development kit (SDK) using the API protocol library 204. The SDK preferably resides on less than 75 Kbytes of flash memory 1002. In some implementation, the SDK may include the application and the protocol implementation, including an encryption mechanism.

Figure 11:
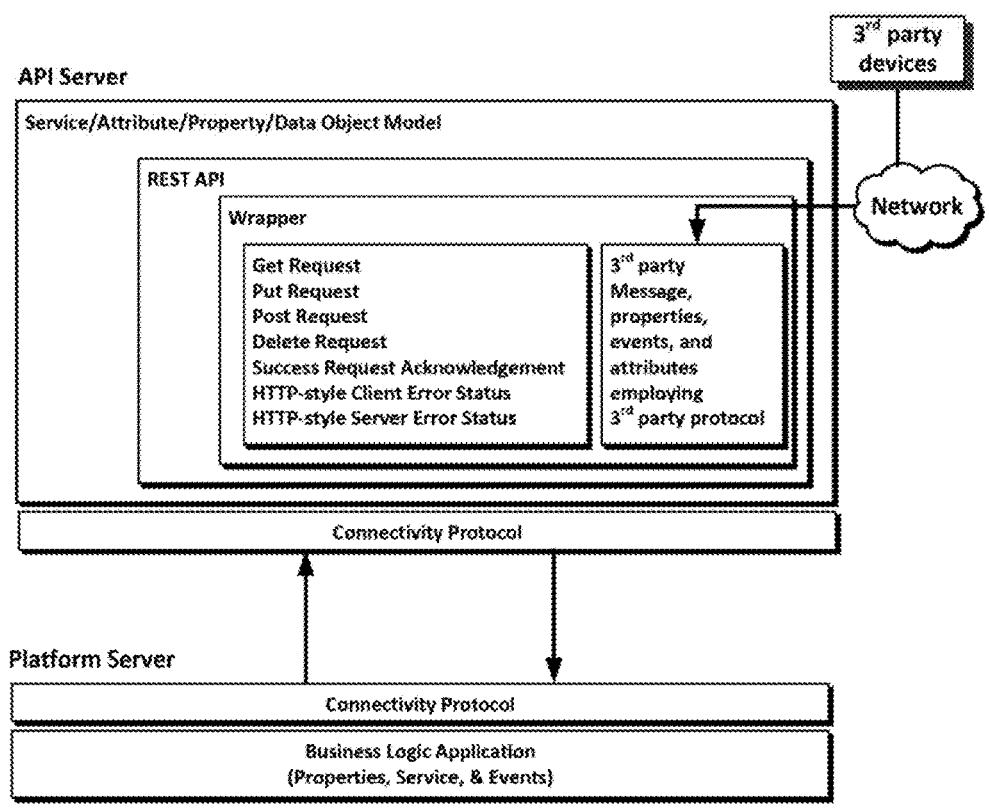
FIG. 11 is a block diagram of an example method of wrapping third party protocols using the API protocol library in accordance with an embodiment of the invention.

FIG. 11 is a flowchart of an example method of communication across multiple communication protocols. The method may be performed, for example, by a software application cooperation with the API protocol library 204 executed upon the API server 110.

The API protocol library 204 provides a dynamic REST API interface that flexibly interoperate with other communication protocol.

In some implementations, the method may be performed at the API servers 110. To this end, legacy sensors and computing devices may be upgraded in the context of communication and controls.

Figure 12:
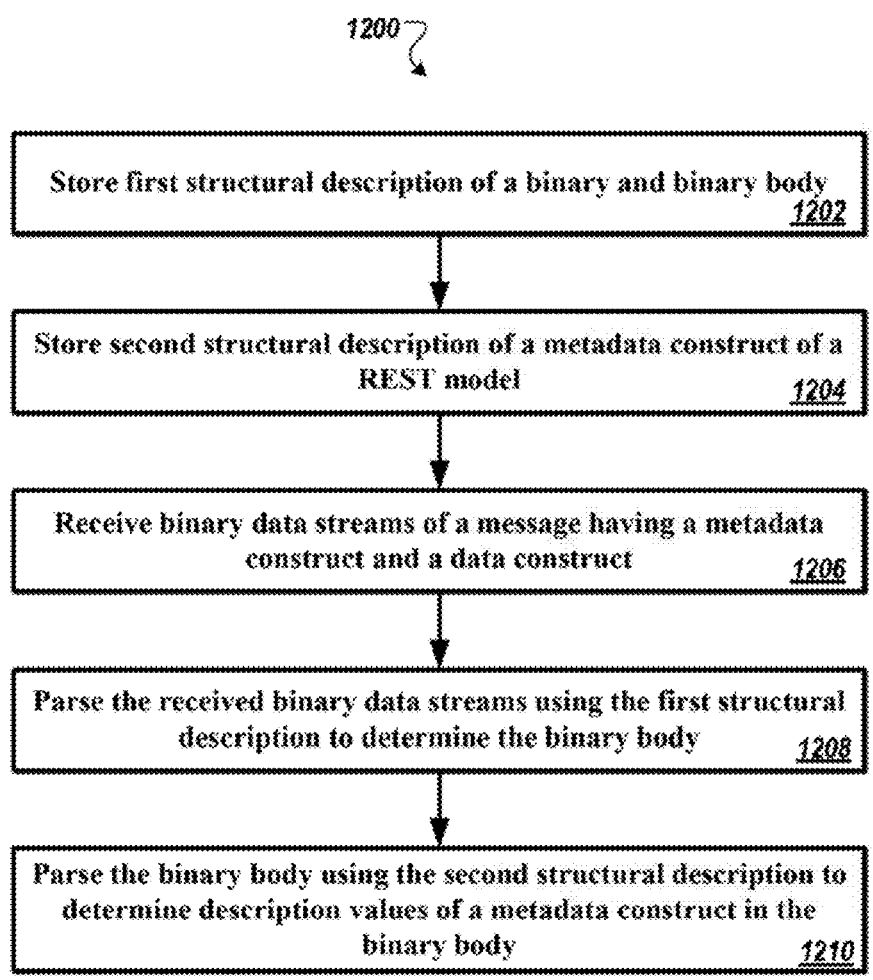
FIG. 12 is a flowchart of an example method for parsing a self-describing message in accordance with an embodiment of the invention.

FIG. 12 is a flowchart of an example method 1200 for parsing a self-describing message in accordance with an embodiment of the invention. The method may include storing, at a memory, a first structural description of the binary header and the binary body (step 1202) and a second structural description of the metadata construct wherein the metadata construct comprises one or more groups of description values corresponding to a given data value of the one or more data values forming the message construct (step 1204). The description values may include a data-value name descriptor, a data-value description-descriptor, and a data value type-descriptor.

In some implementations, the method 1200 include receiving, at a port, a plurality of binary data streams representing a plurality of messages (step 1206).

In some implementations, the method 1200 include parsing, using a processor, each of the plurality of received binary data stream using the first structural description to determine the binary header and the binary body (step 1208).

In some implementations, the method may include parsing, using the processor, the parsed binary body using the second structural description to determine the one or more groups of description values forming the metadata construct where the processor uses a portion of the determined description values of the metadata construct to determine the one or more groups of data values of the message construct (step 1210). Each of the one or more data values of the message construct and each of the one or more description value of the metadata construct may be delineated by a binary marker.

Figure 13:
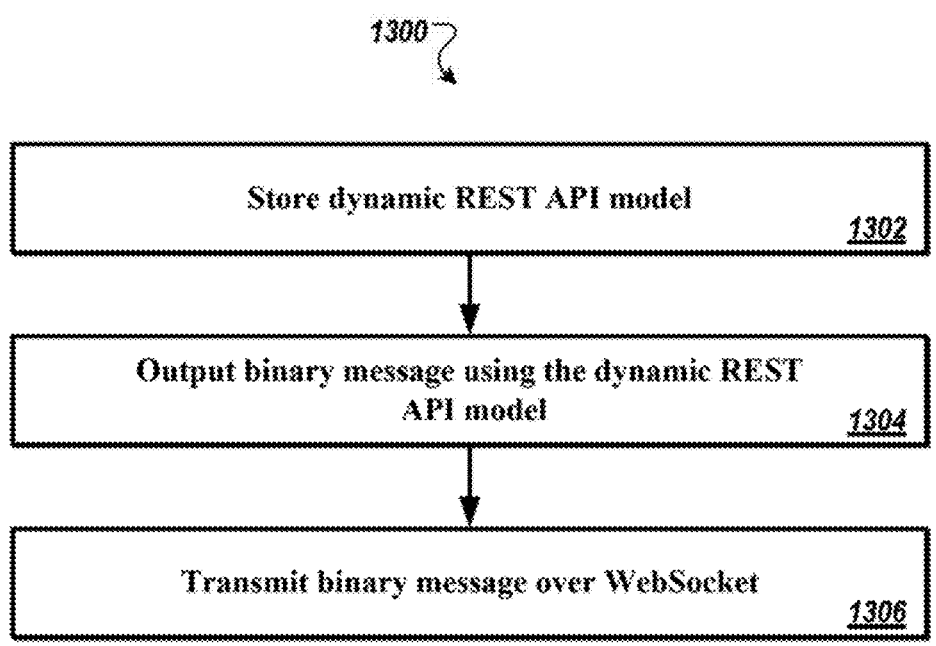
FIG. 13 is a flowchart of an example method of using Web Socket to transmit Dynamic REST messages in accordance with an embodiment of the invention.

FIG. 13 is a flowchart of an example method 1300 of using Web Socket to transmit Dynamic REST messages in accordance with an embodiment of the invention.

In some implementations, the method 1300 may include storing, at a memory of a device, a binary dynamic REST API model (step 1302). The dynamic REST API model may include a data model that includes a data object, an event object, a service object, a property object, and an attribute object.

In some implementations, the method 1300 may include formatting, via a processor at the device, a request message using the binary dynamic REST API model to produce a self-describing request message (step 1304).

In some implementations, the method 1300 may include transmitting, via a port of the device, the request message over a persistent state connection (step 1306). The persistent stateless connection may be over a Web socket connection using a HTTP or HTTPS port.

Figure 14:
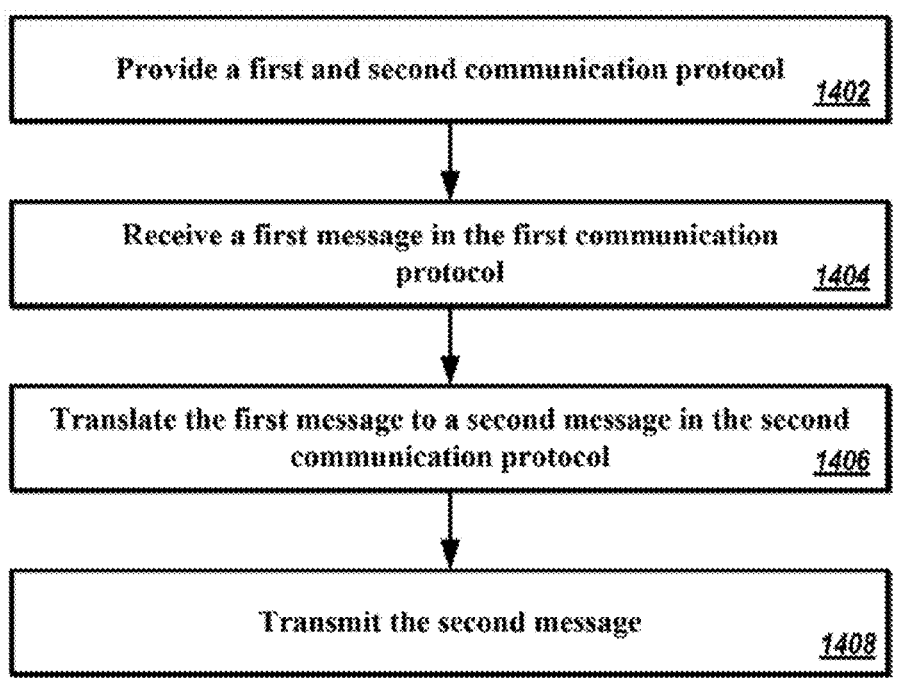
FIG. 14 is a flowchart of an example method of communication with a third party protocol in accordance with an embodiment of the invention.

FIG. 14 is a flowchart of an example method 1400 of communication with a third party protocol in accordance with an embodiment of the invention. The method 1400 may include providing a first communication protocol and a second communication protocol in a memory of a device wherein the first communication protocol may include a plurality of control codes and binary messages having a self-describing schema. The self-describing schema may be a data object model. In some implementations, instances of the second communication protocol may be associatively mapped to the instances of the first communication protocol (step 1402). The data model may be structured in a dynamic REST API object model. The associative mapping of the control codes may be based on a HTML framework.

In some implementations, the method 1400 may include receiving, at a port of a computing device, a first instantiation of a message in the second communication protocol (1404).

In some implementations, the method 1400 may include classifying, by a processor of the computing device, the first instantiation of the message as being either a control message or a data message. The method 1400 then may include translating, by a processor of the computing device, the first instantiation of the message to produce a second instantiation of the message (step 1406). If the message has been classified as a control message, the processor may map the control message to one or more control codes. If the message has been classified as a data message, the processor may map the data message to a binary message having the self-describing schema, as described in relation to FIG. 7.

In some implementations, the method 1400 may include transmitting, at the port of the computing device, the second instantiation of the message (step 1406).

Figure 15:
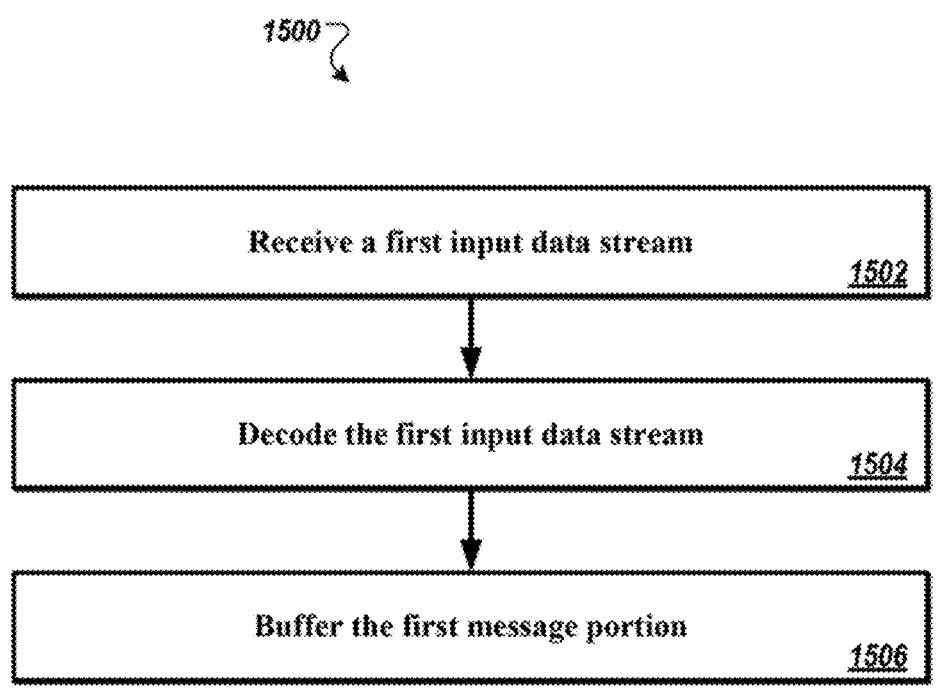
FIG. 15 is a flowchart of an example method of communication using chunked messages in accordance with an embodiment of the invention.

FIG. 15 is a flowchart of an example method 1500 of communication using chunked messages in accordance with an embodiment of the invention.

In some implementations, The method may include receiving, at a port, one or more data streams among a plurality of data streams, including a first data stream and a second data stream (1502).

In some implementations, the method 1500 may include storing, at a first buffer, a received first data stream and a received second data stream (step 1504).

In some implementations, the method 1500 may include storing, at a second buffer, portions of a decoded message (step 1506).

In some implementations, the method 1500 may include decoding, using a processor, the received data stream buffered within the first buffer to produce a given decoded portion. The processor may store the given decoded portion to the second buffer where the processor initiates decoding of the received first data stream buffered within the first buffer prior to a complete receipt of the received second data stream.

Figure 16:
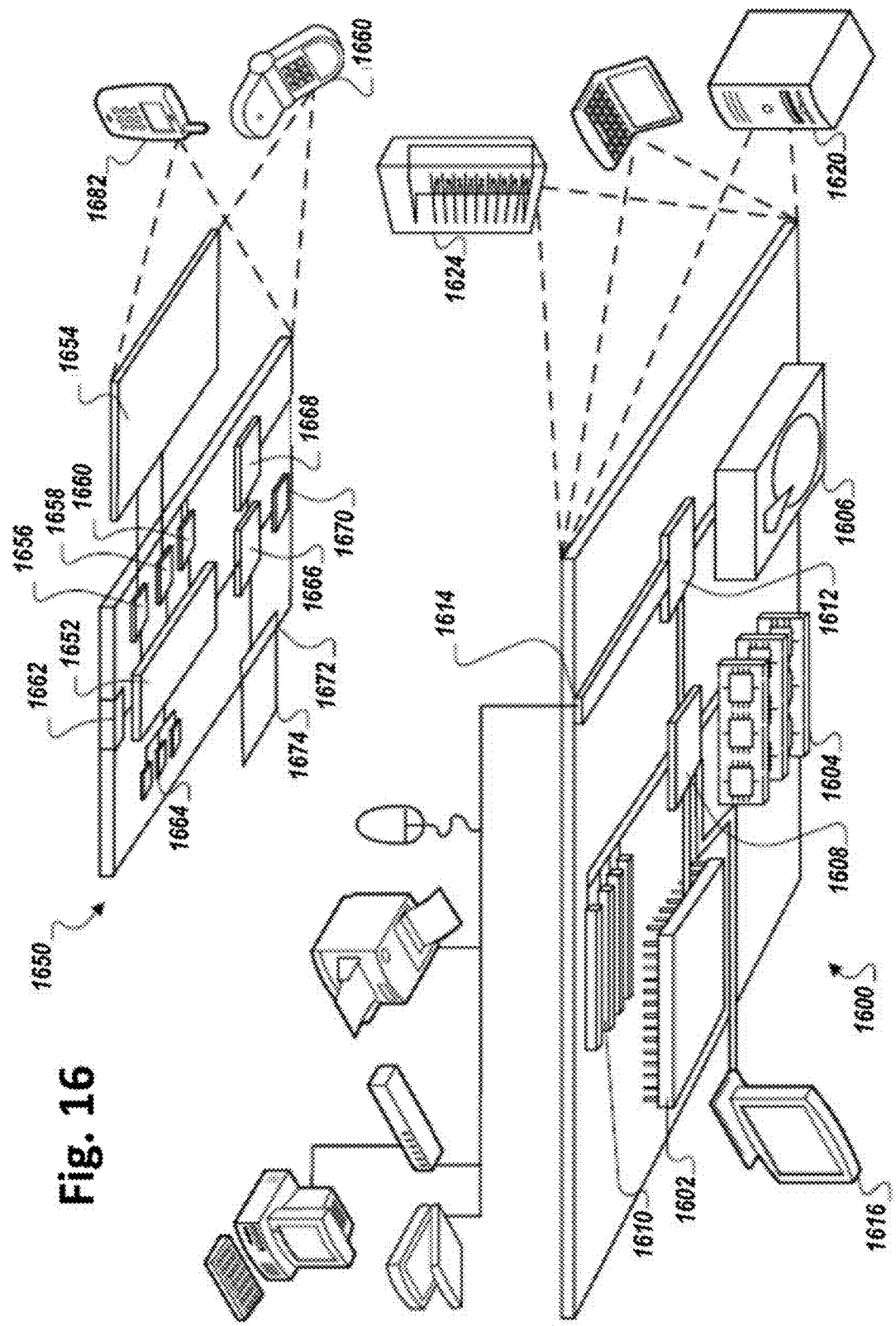
FIG. 16 is a block diagram of a computing device and a mobile computing device.

FIG. 16 shows an example of a computing device 1600 and a mobile computing device 1650 that can be used to implement the techniques described in this disclosure. The computing device 1600 is intended to represent various forms of digital computers, such as laptops, desktops, workstations, personal digital assistants, servers, blade servers, mainframes, and other appropriate computers. The mobile computing device 1650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1600 may include a processor 1602, a memory 1604, a storage device 1606, a high-speed interface 1608 connecting to the memory 1604 and multiple high-speed expansion ports 1610, and a low-speed interface 1612 connecting to a low-speed expansion port 1614 and the storage device 1606. Each of the processor 1602, the memory 1604, the storage device 1604, the high-speed interface 1608, the high-speed expansion ports 1610, and the low-speed interface 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as a display 816 coupled to the high-speed interface 1608. In other implementations, multiple processors and/or multiple buses may be used, as appropriate, along with multiple memories and types of memory. Also, multiple computing devices may be connected, with each of the device providing portions of the necessary operations (e.g., as a server bank, a group of blade servers, or a multi-processor system).

The memory 1604 stores information within the computing device 1600. In some implementations, the memory 1604 is a volatile memory unit or units. In some implementations, the memory 1604 is a non-volatile memory unit or units. The memory 1604 may also be another form of computer-readable medium, such as a magnetic or optical disk.

The storage device 1606 is capable of providing mass storage for the computing device 1600. In some implementations, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1602), perform one or more methods, such as those described above. The instructions can also be stored by one or more storage devices such as computer- or machine-readable mediums (for example, the memory 1604, the storage device 1606, or memory on the processor 1602).

The high-speed interface 1608 manages bandwidth-intensive operations for the computing device 1600, while the low-speed interface 1612 manages lower bandwidth-intensive operations. Such allocation of functions is an example only. In some implementations, the high-speed interface 1608 is coupled to the memory 1604, the display 1616 (e.g., through a graphics processor or accelerator), and to the high-speed expansion ports 1610, which may accept various expansion cards (not shown). In the implementation, the low-speed interface 1612 is coupled to the storage device 806 and the low-speed expansion port 1614. The low-speed expansion port 1614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. In addition, it may be implemented in a personal computer such as a laptop computer 1622. It may also be implemented as part of a rack server system 1624. Alternatively, components from the computing device 800 may be combined with other components in a mobile device (not shown), such as a mobile computing device 1650. Each of such devices may contain one or more of the computing device 1600 and the mobile computing device 1650, and an entire system may be made up of multiple computing devices communicating with each other.

The mobile computing device 1650 may include a processor 1652, a memory 1664, an input/output device such as a display 1654, a communication interface 1666, and a transceiver 868, among other components. The mobile computing device 1650 may also be provided with a storage device, such as a micro-drive or other device, to provide additional storage. Each of the processor 1652, the memory 1664, the display 1654, the communication interface 1666, and the transceiver 1668, are interconnected using various buses, and several of the components may be mounted on a common motherboard or in other manners as appropriate.

The processor 1652 can execute instructions within the mobile computing device 1650, including instructions stored in the memory 1664. The processor 1652 may be implemented as a chipset of chips that include separate and multiple analog and digital processors. The processor 1652 may provide, for example, for coordination of the other components of the mobile computing device 1650, such as control of user interfaces, applications run by the mobile computing device 1650, and wireless communication by the mobile computing device 1650.

The processor 1652 may communicate with a user through a control interface 1658 and a display interface 1656 coupled to the display 1654. The display 1654 may be, for example, a TFT (Thin-Film-Transistor Liquid Crystal Display) display or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may provide communication with the processor 1652, so as to enable near area communication of the mobile computing device 1650 with other devices. The external interface 1662 may provide, for example, for wired communication in some implementations, or for wireless communication in other implementations, and multiple interfaces may also be used.

The memory 1664 stores information within the mobile computing device 1650. The memory 1664 can be implemented as one or more of a computer-readable medium or media, a volatile memory unit or units, or a non-volatile memory unit or units. An expansion memory 1674 may also be provided and connected to the mobile computing device 1650 through an expansion interface 1672, which may include, for example, a SIMM (Single In Line Memory Module) card interface. The expansion memory 1674 may provide extra storage space for the mobile computing device 1650, or may also store applications or other information for the mobile computing device 1650. Specifically, the expansion memory 1674 may include instructions to carry out or supplement the processes described above, and may include secure information also. Thus, for example, the expansion memory 1674 may be provide as a security module for the mobile computing device 1650, and may be programmed with instructions that permit secure use of the mobile computing device 1650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1652), perform one or more methods, such as those described above. The instructions can also be stored by one or more storage devices, such as one or more computer- or machine-readable mediums (for example, the memory 1664, the expansion memory 1674, or memory on the processor 1652). In some implementations, the instructions can be received in a propagated signal, for example, over the transceiver 1668 or the external interface 1662.

The mobile computing device 1650 may communicate wirelessly through the communication interface 1666, which may include digital signal processing circuitry where necessary. The communication interface 1666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1668 using a radio-frequency. In addition, short-range communication may occur, such as using a Bluetooth®, Wi-Fi™, or other such transceiver (not shown). In addition, a GPS (Global Positioning System) receiver module 1670 may provide additional navigation- and location-related wireless data to the mobile computing device 1650, which may be used as appropriate by applications running on the mobile computing device 1650.

The mobile computing device 1650 may also communicate audibly using an audio codec 1660, which may receive spoken information from a user and convert it to usable digital information. The audio codec 1660 may likewise generate audible sound for a user, such as through a speaker, e.g., in a handset of the mobile computing device 1650. Such sound may include sound from voice telephone calls, may include recorded sound (e.g., voice messages, music files, etc.) and may also include sound generated by applications operating on the mobile computing device 1650.

The mobile computing device 1650 may be implemented in a number of different forms, as shown in the figure. For example, it may be implemented as a cellular telephone 1680. It may also be implemented as part of a smart-phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for communication using Dynamic REST messages are provided. Having described certain implementations of methods and apparatus for supporting communication using Dynamic REST messages, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A computer-implemented method for receiving data structured according to a second communication protocol and transmitting the data structured according to a first communication protocol in the network, wherein the second communication protocol is different from the first communication protocol, the method comprising:

providing an associative mapping between the first communication protocol and the second communication protocol in a memory of a computing device, wherein a data message structured according to the first communication protocol comprises a serialized-binary message having a self-describing schema, the serialized-binary message comprising i) a data set comprising data values originating from a connected device, and ii) a metadata construct that includes one or more description values of the data set, and wherein the associative mapping includes one or more control parameters associated with transmission events of the data message to one or more devices in the network, wherein a configuration message structured according to the first communication protocol comprises a second serialized-binary message having the self-describing schema, the second serialized binary message comprising i) the one or more control parameters associated with the transmission events of the data message to the one or more devices in the network, and ii) a second metadata construct that includes one or more description values of the one or more control parameters;

in response to receiving, at a port of the computing device, from a given connected device, a first data message transmitted according to the second communication protocol, generating, at the computing device, according to the associative mapping, a second data message structured according to the first communication protocol and transmitting, according to the associative mapping, the second data message to a device in the network;

in response to receiving, at the port of the computing device, from the device in the network, a given configuration message structured according to the first communication protocol, wherein the given configuration message includes one or more control parameters associated with one or more transmission events of a given data message to one or more devices in the network, updating the associative mapping with the one or more control parameters of the given configuration message; and in response to receiving, at the port of the computing device, from the given connected device, a third data message transmitted according to the second communication protocol, generating, at the computing device, according to the updated associative mapping, a fourth data message structured according to the first communication protocol and transmitting the fourth message, according to the updated associative mapping, to a device in the network.

2. The computer-implemented method of claim 1, wherein the first and third data messages are received via a wireless connection.

3. The computer-implemented method of claim 2, wherein the wireless connection includes a network selected from the group consisting of Zigbee, Bluetooth, WiMax (WiMAX Forum Protocol), Wi-Fi (Wi-Fi Alliance Protocol), GSM (Global System for Mobile Communication), PCS (Personal Communications Services protocol), D-AMPS (Digital- Advanced Mobile Phone Service Protocol), 6LoWPAN (IPv6 Over Low Power Wireless Personal Area Networks Protocol), Ant (ANT network protocol), DASH7 (DASH7 Alliance Protocol), EnOcean, INSTEON, NeuRFON, Senceive, WirelessHART (Wireless Highway Addressable Remote Transducer Protocol), Contiki, TinyOS (Tiny OS Alliance Protocol), GPRS (General Packet Radio Service), TCP/IP (Transmission Control Protocol and Internet Protocol), CoAP (Constrained Application Protocol), MQTT (Message Queuing Telemetry Transport), TR-50 (Engineering Committee TR-50 Protocol, OMA LW M2M (Open Mobile Alliance LightWeight machine-to-machine Protocol), and ETSIM2M (European Telecommunication Standards Institute machine-to-machine Protocol).

4. The computer-implemented method of claim 1, wherein the metadata construct associated with the data set includes a name of the connected-device and a type description of the data set.

5. The computer-implemented method of claim 1, wherein the computing device transmits the second and fourth data messages to a platform server and over a web-socket connection.

6. The computer-implemented method of claim 1, wherein the associative mapping between the first communication protocol and the second communication protocol is stored in persistent memory of the computing device.

7. The computer-implemented method of claim 1, wherein the second and fourth data messages include control codes based on a HTML framework.

8. The computer-implemented method of claim 1, wherein the second and fourth data messages include a service request code selected from the group consisting of a GET request code, a PUT request code, a POST request code, and a DELETE request code.

9. A non-transitory computer readable medium having instruction stored thereon, wherein the instructions, when executed by a processor, cause the processor to:

provide an associative mapping for a first communication protocol and a second communication protocol in a memory, wherein the second communication protocol is different from the first communication protocol, wherein a data message structured according to the first communication protocol comprises a serialized-binary message having a self-describing schema, the serialized-binary message comprising i) a data set comprising data values originating from a connected device, and ii) a metadata construct that includes one or more description values of the data set, and wherein the associative mapping includes one or more control parameters associated with transmission events of the data message to one or more devices in the network, wherein a configuration message structured according to the first communication protocol comprises a second serialized-binary message having the self-describing schema, the second serialized binary message comprising i) the one or more control parameters associated with the transmission events of the data message to the one or more devices in the network, and ii) a second metadata construct that includes one or more description values of the one or more control parameters;

in response to receiving, from a given connected device, a first data message transmitted according to the second communication protocol, generate, according to the associative mapping, a second data message structured according to the first communication protocol and transmit, according to the associative mapping, the second data packet to a device in the network;

in response to receiving, from the device in the network, a given configuration message structured according to the first communication protocol, wherein the given configuration message includes one or more control parameters associated with one or more transmission events of a given data message to one or more devices in the network, update the associative mapping with the one or more control parameters of the given configuration message; and in response to receiving, from the given connected device, a third data message transmitted according to the second communication protocol, generate, according to the updated associative mapping, a fourth data message structured according to the first communication protocol and transmit, according to the updated associative mapping, the fourth data message to a device in the network.

10. The computer readable medium of claim 9, wherein the first data message and the third data message are received via a wireless connection.

11. The computer readable medium of claim 10, wherein the wireless connection includes a network selected from the group consisting of Zigbee, Bluetooth, WiMax (WiMAX Forum Protocol), Wi-Fi (Wi-Fi Alliance Protocol), GSM (Global System for Mobile Communication), PCS (Personal Communications Services protocol), D-AMPS (Digital-Advanced Mobile Phone Service Protocol), 6LoWPAN (IPv6 Over Low Power Wireless Personal Area Networks Protocol), Ant (ANT network protocol), DASH7(DASH7 Alliance Protocol), EnOcean, INSTEON, NeuRF ON, Senceive, WirelessHART (Wireless Highway Addressable Remote Transducer Protocol), Contiki, TinyOS (Tiny OS Alliance Protocol), GPRS (General Packet Radio Service), TCP/IP (Transmission Control Protocol and Internet Protocol), CoAP (Constrained Application Protocol), MQTT (Message Queuing Telemetry Transport), TR-50 (Engineering Committee TR-50Protocol, OMA LW M2M (Open Mobile Alliance LightWeight machine-to-machine Protocol), and ETSIM2M (European Telecommunication Standards Institute machine-to-machine Protocol).

12. The computer readable medium of claim 9, wherein the metadata construct associated with the data set includes a name of the connected device and a type description of the data set.

13. The computer readable medium of claim 9, wherein the second and fourth data messages include control codes based on a HTML framework.

14. The computer readable medium of claim 9, wherein the second and fourth data messages include a service request code selected from the group consisting of a GET request code, a PUT request code, a POST request code, and a DELETE request code.

15. A system comprising:

a processor;

a memory, the memory storing instructions that, when executed by the processor, cause the processor to:

provide an associative mapping between a first communication protocol and a second communication protocol in the memory, wherein the second communication protocol is different from the first communication protocol, wherein a data message structured according to the first communication protocol comprises a serialized-binary message having a self-describing schema, the serialized-binary message comprising i)a data set comprising data values originating from a connected device, and ii) a metadata construct that includes one or more description values of the data set, and wherein the associative mapping includes one or more control parameters associated with transmission events of the data message to one or more devices in the network, wherein a configuration message structured according to the first communication protocol comprises a second serialized-binary message having the self-describing schema, the second serialized binary message comprising i) the one or more control parameters associated with the transmission events of the data message to the one or more devices in the network, and ii) a second metadata construct that includes one or more description values of the one or more control parameters;

in response to receiving, from a given connected device, a first data message transmitted according to the second communication protocol, generate, according to the associative mapping, a second data message structured according to the first communication protocol and transmit, according to the associative mapping, the second data message to a device in the network;

in response to receiving, from the device in the network, a given configuration message structured according to the first communication protocol, wherein the given configuration message includes one or more control parameters associated with one or more transmission events of a given data message to one or more devices in the network, update the associative mapping with the one or more control parameters of the given configuration message; and in response to receiving, from the given connected device, a third data message transmitted according to the second communication protocol, generate, according to the updated associative mapping, a fourth data message structured according to the first communication protocol and transmit, according to the updated associative mapping, the fourth data packet to a device in the network.

16. The system of claim 15, wherein the metadata construct associated with the data set includes a name of the connected device and a type description of the data set.

17. The system of claim 15, wherein the second and fourth data messages include control codes based on a HTML framework.

18. The system of claim 9, wherein the second and fourth data messages include a service request code selected from the group consisting of a GET request code, a PUT request code, a POST request code, and a DELETE request code.

19. The method of claim 1, wherein the second metadata construct includes an event name and an event threshold to transmit the data message.

\* \* \* \* \*